3,426,027
BERBINE DERIVATIVES AND PROCESSES
THEREFOR
Georges Muller, Nogent-sur-Marne, and Andre Poittevin,
Les Lilas, France, assignors to Roussel-UCLAF, Paris,
France, a corporation of France
No Drawing. Filed Feb. 12, 1965, Ser. No. 432,409
Claims priority, application France, Feb. 13, 1964,
963,667; Jan. 6, 1965, 997; Jan. 26, 1965, 3,343
U.S. Cl. 260—289                                13 Claims
Int. Cl. C07d 35/10, 35/4

ABSTRACT OF THE DISCLOSURE

Novel Berbine derivatives and synthesis of these and known berbines from phenethylamine and isochromane condensation and subsequent cyclization, reduction and debromination are disclosed. The compounds have analgesic and tranquillizing activity.

---

The present invention relates to tetracyclic alkaloids derived from isoquinoline and a new process for the preparation of the alkaloid derivatives. The invention has more particularly for its object a process of preparation of derivatives of berbine of the general Formula I:

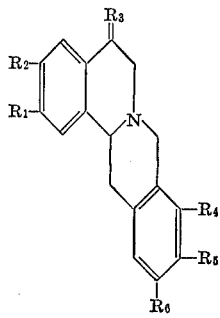

in which $R_1$=H, $OCH_3$, $OC_2H_5$
$R_2$=H, $OCH_3$, $OC_2H_5$

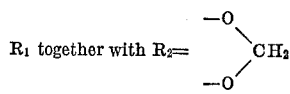

$R_1$ or $R_2$=$OCH_2C_6H_5$
$R_3$=$H_2$, $(CH_3)_2$
$R_4$=$R_5$=$OCH_3$, $OC_2H_5$
$R_6$=H, $CH_3$, $CH_2OCH_3$ the preferred compounds correspond to the following definitions, in which when $R_4$=$R_5$=$OCH_3$, the other substituents signify $R_1$=$R_2$=$OCH_3$, $R_3$=$H_2$, $R_6$=H or $CH_3$ or $CH_2OCH_3$,
or $R_2$=$OCH_3$, $R_1$=$R_6$=H, $R_3$=$H_2$,
or $R_1$=$OCH_3$, $R_2$=$R_6$=H, $R_3$=$H_2$,
or $R_1$=$R_2$=$OCH_3$, $R_3$=$(CH_3)_2$, $R_6$=H,
or $R_1$=$OCH_2C_6H_5$, $R_2$=$OCH_3$, $R_3$=$H_2$, $R_6$=H,

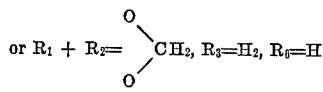

These definitions have in the following the same meaning.

Tetrahydropalmatine, a derivative of berbine of Formula I, with $R_1$=$R_2$=$R_4$=$R_5$=$OCH_3$, $R_3$=$H_2$, $R_6$=H is an alkaloid which is found in its natural state in certain plants of the family of the fumiriaces. In particular, tetrahydropalmatine has been isolated by Späth et al. [Ber. 56, 875 (1923)] from roots of *Corydalis cava*. It has been equally extracted from *Dicentra formosa*. The derivatives of berbine of the Formula I, both the known products and the novel products of the invention, are possessed of interesting physiological properties. They present particularly a tranquilizing and analgesic activity. The analgesic activity of tetrahydropalmatine was reported in Chemical Abstracts, vol. 53, col. 13390e, and its effects on the central nervous system were reported in Chemical Abstracts, vol. 62, col. 2155e. In addition to the activity of tetrahydropalmatine, as well as the results of a clinical test utilizing the same have been published by Yang, Acta Primae and Secondae Acadamiae Medicinae Shangai, 1959, No. 6, p. 577.

One finds in the literature the description of a certain number of syntheses for the preparation of tetrahydropalmatine. One will note the conversion of tetrahydroberberine into tetrahydropalmatine (Henry, "The Plant Alkaloids," pages 292 and 343) or also the process which consists in condensing demethylated tetrahydropapaveroline with formaldehyde, then methylating the resultant product of condensation (Henry, "The Plant Alkaloids," pages 292 and 343).

However, the methods known to date, furnish only poor yields and the product obtained is often mixed with other compounds as, for example, norcorydaline (Henry, "The Plant Alkaloids," page 343).

An object of the present invention is the development of a process for the preparation of tetracyclic alkaloids derived from isoquinoline by total synthesis.

Another object of the present invention is the development of a process for the preparation of a derivative of berbine of the formula

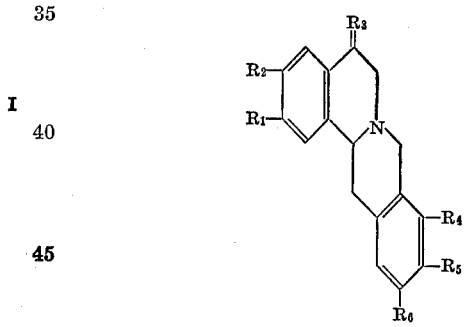

wherein $R_1$ and $R_2$ are members selected from the group consisting of hydrogen, methoxy, ethoxy, benzyloxy and, when taken together, methylenedioxy; $R_3$ is a member selected from the group consisting of $H_2$ and $(CH_3)_2$; $R_4$ and $R_5$ represent the same substituents selected from the group consisting of methoxy and ethoxy; and $R_6$ is a member selected from the group consisting of hydrogen, methyl and methoxymethyl; which comprises the steps of reacting a phenylacetic acid of the formula

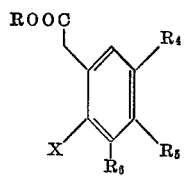

wherein $R_4$, $R_5$ and $R_6$ have the above-assigned meanings, R is a member selected from the group consisting of hydrogen and lower alkyl and X represents a halogen having an atomic weight of over 35 with a formylating reagent selected from the group consisting of methoxychloromethane in the presence of a Lewis acid and aqueous formaldehyde in the presence of sulfuric acid, condensing the resulting isochromane of the formula

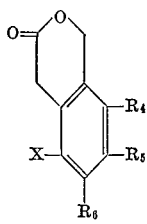

wherein X, $R_4$, $R_5$ and $R_6$ have the above-assigned meanings with a β-phenylethylamine of the formula

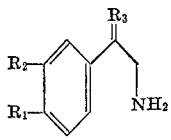

wherein $R_1$, $R_2$ and $R_3$ have the above-assigned values, effecting a Bischler-Napieralski cyclization accompanied by halogenation on the resulting phenylacetamide of the formula

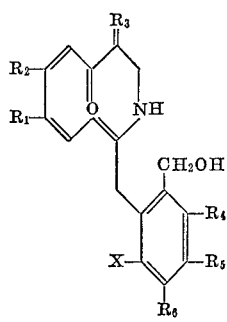

wherein $R_1$, $R_2$, $R_3$, $R_4$, $R_5$, $R_6$ and X have the above-assigned values, reducing the resulting 3,4-dihydroisoquinoline of the formula

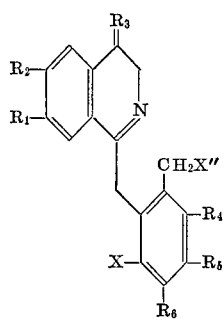

wherein $R_1$, $R_2$, $R_3$, $R_4$, $R_5$, $R_6$ and X have the above-assigned values and X″ represents a halogen, with simultaneous cyclization by the action of an alkali-metal borohydride, and after dehalogenation recovering said derivative of berbine.

A yet further object of the present invention is the obtention of the novel intermediates:

(A) An isochromane of the formula

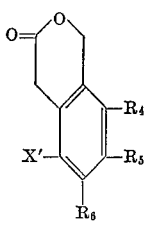

wherein $R_4$ and $R_5$ represent the same substituents selected from the group consisting of methoxy and ethoxy; $R_6$ represents a member selected from the group consisting of hydrogen, methyl and methoxymethyl; and X′ represents a member selected from the group consisting of hydrogen and a halogen having an atomic weight of over 35.

(B) A phenylacetamide of the formula

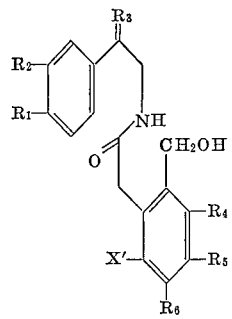

wherein $R_1$ and $R_2$ represent members selected from the group consisting of hydrogen, methoxy, ethoxy, benzyloxy and, when taken together, methylenedioxy; $R_3$ represents a member selected from the group consisting of $H_2$ and $(CH_3)_2$; $R_4$ and $R_5$ represent the same substituents selected from the group consisting of methoxy and ethoxy; $R_6$ represents a member selected from the group consisting of hydrogen, methyl and methoxymethyl; and X′ represents a member selected from the group consisting of hydrogen and a halogen having an atomic weight of over 35.

(C) A 3,4-dihydroisoquinoline of the formula

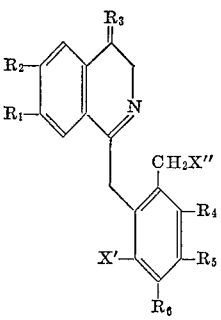

wherein $R_1$ and $R_2$ represent members selected from the group consisting of hydrogen, methoxy, ethoxy, benzyloxy and, when taken together, methylenedioxy; $R_3$ represents a member selected from the group consisting of $H_2$ and $(CH_3)_2$; $R_4$ and $R_5$ represent the same substituents selected from the group consisting of methoxy and ethoxy; $R_6$ represents a member selected from the group consisting of hydrogen, methyl and methoxymethyl; X′ represents a member selected from the group consisting of hydrogen and a halogen having an atomic weight of over 35; and X″ represents a halogen.

(D) A 12-halo-berbine derivative of the formula

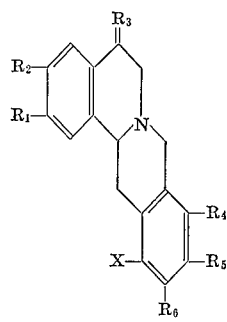

wherein $R_1$ and $R_2$ represent members selected from the group consisting of hydrogen, methoxy, ethoxy, benzyloxy and, when taken together, methylenedioxy; $R_3$ represents a member selected from the group consisting of $H_2$ and $(CH_3)_2$; $R_4$ and $R_5$ represent the same substituents selected from the group consisting of methoxy and ethoxy; $R_6$ represents a member selected from the group consisting of hydrogen, methyl and methoxymethyl; and X represents a halogen having an atomic weight of over 35.

A still further object of the present invention is the obtention of a berbine derivative of the formula

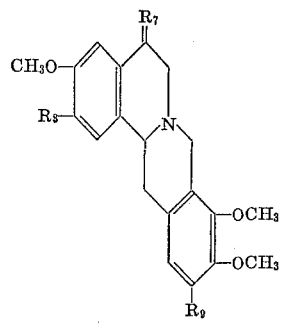

wherein $R_7$ represents a member selected from the group consisting of $H_2$ and $(CH_3)_2$; $R_8$ represents a member selected from the group consisting of hydrogen, methoxy and benzyloxy, and $R_9$ represents a member selected from the group consisting of hydrogen, methyl and methoxymethyl with the proviso that when $R_7$ is $H_2$ and $R_9$ is hydrogen, $R_8$ is selected from the group consisting of hydrogen and benzyloxy. Particularly, 3,9,10-trimethoxy-berbine
2,3,9,10-tetramethoxy-5,5-dimethyl-berbine
2,3,9,10-tetramethoxy-11-methyl-berbine
2,3,9,10-tetramethoxy-11-methoxymethyl-berbine and
2-benzyloxy-3,9,10-trimethoxy-berbine.

These and other objects of the invention will become more apparent as the description thereof proceeds.

The process of preparation according to the invention allows, by contrast to the above-mentioned prior art processes, the accession of derivatives of berbine of Formula I by direct synthesis under conditions of ease, starting from known products, with an elevated total yield and furnishes products of greatest purity.

The said process is shown by the flow diagram of Table I.

Table I

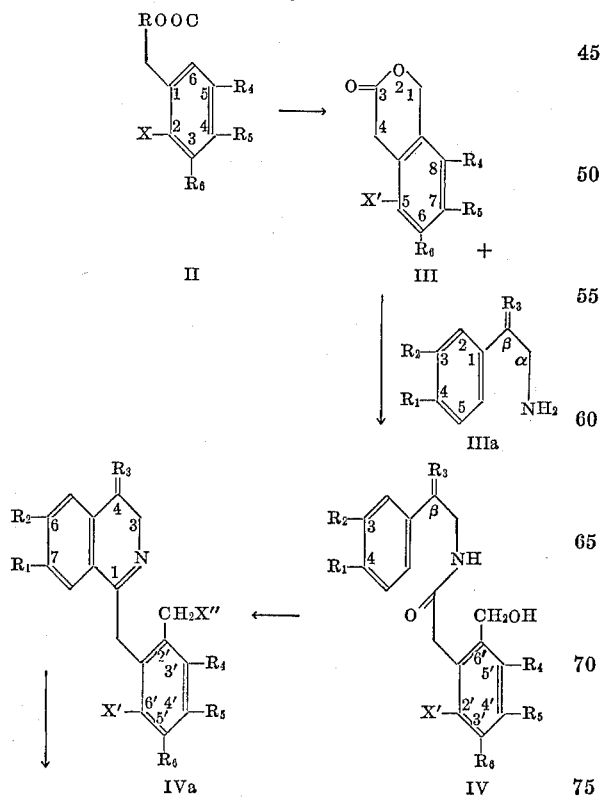

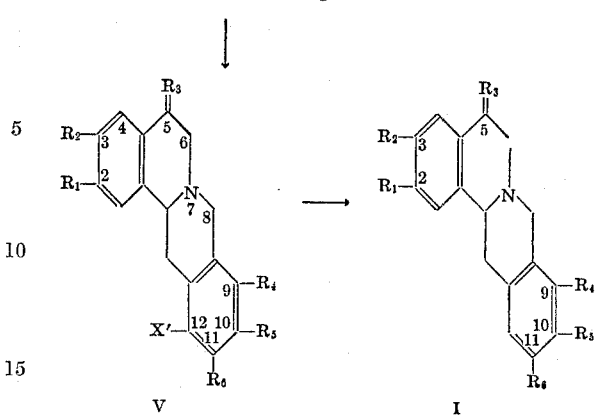

wherein $R_1$ and $R_2$ represent members selected from the group consisting of hydrogen, methoxy, ethoxy, benzyloxy and, when taken together, methylenedioxy; $R_3$ represents a member selected from the group consisting of $H_2$ and $(CH_3)_2$; $R_4$ and $R_5$ represent the same substituents selected from the group consisting of methoxy and ethoxy; $R_6$ represents a member selected from the group consisting of hydrogen, methyl and methoxymethyl; R represents a member selected from the group consisting of hydrogen and lower alkyl; X represents a halogen having an atomic weight of over 35; X' represents a member selected from the group consisting of hydrogen and a halogen having an atomic weight of over 35; and X" represents a halogen.

This process is characterized in that a phenylacetic acid of the formula

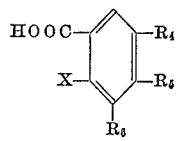

wherein $R_4$, $R_5$, $R_6$ and X have the above-assigned values, is reacted with a formylating reagent chosen from among methoxychloromethane in the presence of a Lewis acid, and formaldehyde, preferably an aqueous solution of formaldehyde (formol), in the presence of sulfuric acid. The reaction is conducted at temperatures from 0° C. to about 120° C.

The product of the reaction, an isochromane of the formula

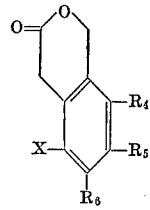

wherein $R_4$, $R_5$, $R_6$ and X have the above-assigned values, is condensed with a β-phenylethylamine of the formula

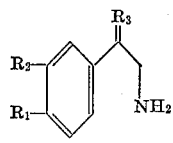

wherein $R_1$, $R_2$ and $R_3$ have the above-assigned values. This reaction is conducted in the presence of an organic solvent at temperatures up to the reflux temperature.

The product of the reaction, a phenylacetamide of the formula

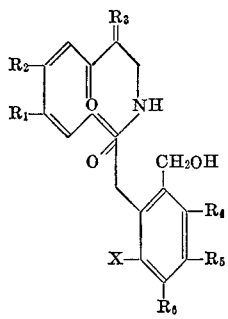

wherein $R_1$, $R_2$, $R_3$, $R_4$, $R_5$, $R_6$ and X have the above-assigned values is subjected to a cyclization according to Bischler-Napieralski, accompanied by halogenation.

The product of the reaction, a 3,4-dihydroisoquinoline of the formula

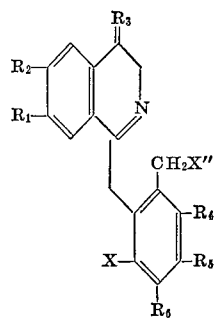

wherein $R_1$, $R_2$, $R_3$, $R_4$, $R_5$, $R_6$, X and X'' have the above-assigned values, is reduced by an alkaline borohydride, preferably an alkali metal borohydride in an organic solvent. This reaction is accompanied by a second cyclization.

The product of the reaction, a 12-halo-berbine derivative of the formula

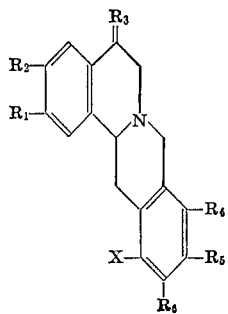

wherein $R_1$, $R_2$, $R_3$, $R_4$, $R_5$, $R_6$ and X have the above-assigned values, is subjected to a dehalogenation with the aid of a reducing agent and the desired berbine derivative of Formula I is isolated.

The starting phenylacetic acid utilized is preferentially a brominated derivative (Formula II, X=Br). The Lewis acid employed during the formation of the derivative of isochromane is preferably tin chloride or zinc chloride. When for the same reaction formol is utilized, this latter is employed preferentially in dilute sulfuric acid at a temperature of about 100 to 110° C.

The cyclization according to Bischler-Napieralski accompanied by halogenation is effected preferentially by means of a halogenated derivative of phosphorus, such as phosphorus oxychloride, phosphorus pentachloride or phosphorus oxybromide, while operating at elevated temperatures, optionally in an organic solvent such as a benzenic hydrocarbon solvent.

The alkaline borohydride employed in the reduction of the isoquinolinic derivative (IVa) is preferably sodium or potassium borohydride.

The dehalogenation step at the last stage of the process of the invention is effected preferably by the action of zinc in an alkaline solvent media or by hydrogenation in the presence of a catalyst in an organic solvent, such as palladized carbon black in ethanol.

According to one variant of the process according to the invention, a lower alkyl ester of a phenylacetic acid (II, with R=lower alkyl) can be utilized rather than the free acid under the same reaction conditions, provided that the substituent on $R_6$ is other than hydrogen. If the substituent on $R_6$ is hydrogen a formylation in the 3 position occurs in addition to formylation in the 6 position. The ester is made to react with a formylating reagent chosen from among methoxychloromethane in the presence of a Lewis acid, such as tin chloride or zinc chloride and formaldehyde in the presence of sulfuric acid. After alkalinization, the isochromane of Formula III is isolated and the synthesis is continued as indicated above.

According to another variant of the process of the invention, in place of effecting the dehalogenation at the final step, this dehalogenation can be realized by the action of the same reducing agent on the derivative of isochromane of Formula III, where X'=X, that is to say, after the second step of the process without modifying the specificity of the following reaction steps of the synthesis. In this event the substituent X' of Formulas III, IV and IVa is hydrogen and one goes from Formula IVa directly to the compounds of Formula I. The reducing agent employed for the early dehalogenation is preferably zinc in an alkaline solvent media.

According to yet another variant of the process of the invention, one can with the view to obtaining 2,3,9,10-tetramethoxy-11-methyl-berbine (I, $$R_1=R_2=R_4=R_5=OCH_3$$

$R_3=H_2$, $R_6=CH_3$), react a lower alkyl ester of 2-X-4,5-dimethoxyphenylacetic acid (II, with R=lower alkyl, $R_4=R_5=OCH_3$, $R_6=H$) with methoxychloromethane in the presence of a Lewis acid, as defined above, subject the resulting lower alkyl ester of 2-X-3-chloromethyl-4,5-dimethoxyphenylacetic acid to a selective reduction, obtain the corresponding 3-methyl derivative which is reacted with methoxychloromethane in the presence of a Lewis acid as defined above, isolated after alkalinization by means of an aqueous solution of an alkali metal hydroxide, 3-oxo-5-X'-6-methyl-7,8-dimethoxyisochromane (III, with X'=X, $R_6=CH_3$, $$R_4=R_5=OCH_3)$$

and continue the synthesis as indicated above. The selective reduction of the lower alkyl ester of 2-X-3-chloromethyl-4,5-dimethoxyphenylacetic acid is effected preferably with the aid of zinc and acetic acid.

According to a still further variation of the process according to the invention, one can with the view of obtaining 2,3,9,10-tetramethoxy-11-methoxymethyl-berbine, cause to react a lower alkyl ester of a 2-X-4,5-dimethoxyphenylacetic acid (II, with R=lower alkyl, $$R_4=R_5=OCH_3$$

$R_6=H$) with methoxy chloromethane in the presence of a Lewis acid, as defined above, subject the resulting lower alkyl ester of 2-X-3-chloromethyl-4,5-dimethoxyphenylacetic acid to the action of methanol in the presence of an aqueous solution of an alkali metal hydroxide, isolate after acidification by means of a mineral acid 2-X-3-methoxymethyl - 4,5 - dimethoxyphenylacetic acid (II, with R=H, $R_4=R_5=OCH_3$, $R_6=CH_2OCH_3$) which is esterified by means of a diazo lower alkane in the presence of an organic solvent, the lower alkyl ester of the 2-X-3-methoxymethyl - 4,5 - dimethoxyphenylacetic acid is made to react with methoxychloromethane in the presence of a Lewis acid, as defined above, isolated after alkalization by means of an aqueous solution of an alkali metal hydroxide, the 3-oxo-5-X'-6-methoxymethyl-7,8-dimethoxy-isochromane (III, with X'=X, $R_6$=$CH_2OCH_3$, $R_4$=$R_5$=$OCH_3$) and continue the synthesis as indicated above.

The following examples illustrate the invention without, however, limiting it.

EXAMPLE I

Prepared of d,l-tetrahydropalmatine (I, with $R_1$=$R_2$=$R_4$=$R_5$=$OCH_3$, $R_3$=$H_2$ and $R_6$=H)

Step A: 3-oxo - 5 - bromo-7,8-dimethoxy-isochromane (III, with $R_4$=$R_5$=$OCH_3$, $R_6$=H, X'=Br).—40 gm. of 2-bromo - 4,5 - dimethoxyphenylacetic acid (II, R=H, $R_4$=$R_5$=$OCH_3$, $R_6$=H, X=Br) which could be prepared according to the method described in J. Chem. Soc. 1925, page 1451, were dissolved in 560 cc. of methylene chloride. About 60 cc. of this solution were distilled therefrom in order to eliminate all traces of water. The solution was cooled to 0° C., then 35 cc. of tin tetrachloride and 240 cc. of methoxychloromethane were added.

The reaction mixture was allowed to stand for a period of 2 hours at room temperature, then it was poured into iced water. The mixture was extracted next with methylene chloride. The methylene chloride extracts were washed with water, then with sodium bicarbonate, and evaporated to dryness. A neutral amorphous product was obtained.

The product obtained was recrystallized from ether and from methanol to give 3-oxo-5-bromo-7,8-dimethoxy-isochromane (III, with $R_4$=$R_5$=$OCH_3$, $R_6$=H, X'=Br), having a melting point of 188° C.

The product is colorless and is insoluble in water, very slightly soluble in ether, slightly soluble in alcohol and methanol and soluble in acetone and chloroform.

*Analysis.*—Calculated for $C_{11}H_{11}O_4Br$; molecular weight=287.12: C, 46.01%; H, 3.86%; Br, 27.84%. Found: C, 46.1%; H, 4.0%; Br, 26.8%.

This compound is not described in the literature.

One can also prepare 3-oxo-5-bromo-7,8-dimethoxy-isochromane while utilizing as catalysts zinc bromide, in order to do this, one operates as follows:

1 gm. of 2-bromo-4,5-dimethoxyphenylacetic acid (II, with R=H, $R_4$=$R_5$=$OCH_3$, $R_6$=H, X=Br) were dissolved in 40 cc. of methylene chloride. About 10 cc. of the solution were distilled therefrom in order to eliminate all traces of water. Then 1 gm. of zinc chloride and 1 cc. of methoxychloromethane were added thereto.

The reaction mixture was agitated for a period of 16 hours at room temperature then it was poured into water. The mixture was next extracted with methylene chloride. The methylene chloride extracts were washed with sodium bicarbonate and with water and evaporated to dryness, the residue was then crystallized from ether and 3-oxo-5-bromo-7,8-dimethoxy-isochromane (III, with $R_4$=$R_5$=$OCH_3$, $R_6$=H, X'=Br)

having a melting point of 188° C. was obtained identical to the preceding lactone.

Another method of preparation of 3-oxo-5-bromo-7,8-dimethoxy-isochromane, can also be employed by utilizing a formaldehyde solution (formol) while operating in sulfuric acid as follows:

1.8 cc. of concentrated sulfuric acid was introduced into 3.6 cc. of water. To the mixture formed, 1.78 gm. of 2-bromo-4,5-dimethoxyphenylacetic acid (II, with R=H, $R_4$=$R_5$=$OCH_3$, $R_6$=H, X=Br) and 1.2 cc. of a 40% formaldehyde solution (formol) was added, then the reaction mixture was heated to a temperature of 110° C. for a period of 18 hours.

Next, the reaction mixture was cooled and poured into methylene chloride. The organic phase was washed with water, then with sodium bicarbonate and again with water, and evaporated to dryness. 793 mg. of a neutral resin were obtained. This resin was subject to chromatography through alumina with elution with methylene chloride. The eluate was evaporated to dryness. The residue was then crystallized from ether and 3-oxo-5-bromo-7,8-dimethoxy-isochromane (III, with $R_4$=$R_5$=$OCH_3$, $R_6$=H, X'=Br) having a melting point of 188° C. was obtained, identical to the preceding lactone.

Step B: N-[β-(3,4-dimethoxyphenyl)-ethyl]-(2'-bromo-4',5'-dimethoxy-6'-hydroxymethyl) - phenyl - acetamide (IV, with $R_1$=$R_2$=$R_4$=$R_5$=$OCH_3$, $R_3$=$H_2$, $R_1$=H, X'=Br).—2.155 gm. of 3-oxo-5-bromo-7,8-dimethoxy-isochromane (III, with $R_4$=$R_5$=$OCH_3$, $R_6$=H, X'=Br) and 1.925 gm. of homoveratrylamine (IIIa, with $R_1$=$R_2$=$OCH_3$, $R_3$=$H_2$)

were dissolved in 160 cc. of ethanol then the mixture was heated to reflux for a period of 15 hours.

The reaction mixture was cooled and taken up with water and methylene chloride. The water was decanted, the methylene chloride phase was evaporated to dryness and 4.76 gm. of a residue was obtained which was dissolved in a mixture of methylene chloride and ether (1:3).

The solution was iced and the precipitate was vacuum filtered and dried. 3.02 gm. of N-[β-(3,4-dimethoxyphenyl) - ethyl] - (2'-bromo-4',5'-dimethoxy-6'-hydroxymethyl)-phenyl-acetamide (IV, with $R_1$=$R_2$=$R_4$=$R_5$=$OCH_3$, $R_3$=$H_2$, $R_6$=H, X=Br)

having a melting point of 137° C. was obtained after recrystallization from methylene chloride and from ether.

The product is slightly soluble in ether and soluble in chloroform.

*Analysis.*—Calculated for $C_{21}H_{26}O_6NBr$; molecular weight=468.35: C, 53.85%; H, 5.6%; N, 2.99%; Br, 17.06%. Found: C, 54.0%; H, 5.5%, N, 3.2%; Br, 17.1%.

This compound is not described in the literature.

Step C: 12-bromo-tetrahydropalmatine (V, with $R_1$=$R_2$=$R_4$=$R_5$=$OCH_3$, $R_3$=$H_2$, $R_6$=H, X'=Br).—4 gm. of N-[β-(3,4-dimethoxyphenyl)-ethyl]-(2'-bromo-4',5'-dimethoxy-6'-hydroxymethyl) - phenyl - acetamide (IV, with $R_1$=$R_2$=$R_4$=$R_5$=$OCH_3$, $R_3$=$H_2$, $R_6$=H, X'-Br) was introduced into 160 cc. of benzene. 16 cc. of phosphorus oxychloride was added and the reaction mixture was heated to reflux for a period of one hour and a half.

Next, the reaction mixture was evaporated to dryness under vacuum. The residue was taken up by a mixture of ice, water and methylene chloride. The methylene chloride phase was decanted and washed abundantly with water. Thereafter, the methylene chloride phase was evaporated to dryness and a residue composed essentially of 1-[(6'-bromo-3',4'-dimethoxy-2'-chloromethyl-phenyl)-methyl]-6,7-dimethoxy-3,4-dihydro-isoquinoline (IVa, with $R_1$=$R_2$=$R_4$=$R_5$=$OCH_3$, $R_3$=$H_2$, $R_6$=H, X'=Br, X''=Cl) was obtianed.

This product was taken up with 160 cc. of methanol, 7.2 gm. of sodium borohydride were added by small amounts at room temperature and the reaction mixture was agitated for a period of 2 hours. Next, the mixture was poured into methylene chloride. The organic phase was washed with water until the wash waters were neutral and evaporated to dryness.

3.94 gm. of a raw product were obtained which was subject to chromatography through alumina and eluted with methylene chloride containing 2% of methanol. After evaporation and recrystallization from ether, 2.421 gm. of 12-bromo-tetrahydropalmatine (V, with $R_1$=$R_2$=$R_4$=$R_5$=$OCH_3$, $R_3$=$H_2$, $R_6$=H, X'=Br)

were obtained having a melting point of 162° C.

The product is soluble in dilute aqueous acids and chloroform, and is slightly soluble in ether.

*Analysis.*—Calculated for $C_{21}H_{24}O_4NBr$; molecular weight=434.33: C, 58.07%; H, 5.57%; N, 3.23%; Br, 18.40%. Found: C, 58.0%; H, 5.6%; N, 3.2%; Br, 18.1%.

This compound is not described in the literature.

Step D: d,l-tetrahydropalmatine (I, with $$R_1=R_2=R_4=R_5=OCH_3$$

$R_3=H_2$, $R_6=H$).—2.6 gm. of 12-bromo-tetrahydropalmatine (IVa, with $R_1=R_2=R_4=R_5=OCH_3$, $R_3=H_2$, $R_6=H$, $X'=Br$) were dissolved by heating at reflux in 100 cc. of ethanol. 10 cc. of sodium hydroxide solution were added. Then slowly, 16.6 gm. of zinc powder were introduced and the agitation was continued while maintaining the reflux for a period of one hour.

The reaction mixture was next cooled and vacuum filtered. The filter cake was washed with ethanol and with methylene chloride and the filtrates were combined and poured into water. The aqueous mixture was extracted with methylene chloride. The methylene chloride extract was washed with water until the wash waters were neutral and evaporated to dryness.

The residue obtained was recrystallized from ether and from a mixture of methylene chloride and ether. 1.368 gm. of d,l-tetrahydropalmatine (I, with $$R_1=R_2=R_4=R_5=OCH_3$$

$R_3=H_2$, $R_6=H$) were obtained having a melting point of 151° C.

The product is slightly soluble in ether, and soluble in chloroform and dilute aqueous acids.

*Analysis.*—Calculated for $C_{21}H_{25}O_4N$; molecular weight=355.42: C, 70.96%; H, 7.09%; N, 3.94%. Found: C, 70.7%; H, 7.1%; N, 3.9%.

d,l-Tetrahydropalmatine can be resolved into its optical antipodes by known methods as for example, the method of Spath (Ber. 1930, page 3007) who employs d-tartaric acid.

EXAMPLE II

Preparation of d,l-tetrahydropalmatine after debromination of 3-oxo-5-bromo-7,8-dimethoxy-isochromane Step A: 3-oxo-7,8-dimethoxy-isochromane (III, with $R_4=R_5=OCH_3$, $R_6=H$, $X'=H$).—7.2 gm. of 3-oxo-5-bromo-7,8-dimethoxy-isochromane (III, with $$R_4=R_5=OCH_3$$

$R_6=H$, $X'=Br$) were introduced into 220 cc. of ethanol. 36 cc. of a sodium hydroxide solution and 57.6 gm. of pulverulent zinc were added and the mixture was heated to reflux for 1 hour. The reaction mixture was next cooled and filtered. The zinc was washed with ethanol and the combined filtrates were reduced under a vacuum to a small volume.

The mixture was diluted with water, brought to a pH of 1 by the addition of hydrochloric acid and agitated for a period of 3 hours at room temperature. Thereafter, the mixture was extracted with methylene chloride. The extracts were washed with water, with a solution of sodium bicarbonate, then again with pure water, dried and distilled to dryness.

The residue was crystallized from isopropyl ether and 4.3 gm. of 3-oxo-7,8-dimethoxy-isochromane (III, with $R_4=R_5=OCH_3$, $R_6=H$, $X'=H$) were obtained.

*Analysis.*—Calculated for $C_{11}H_{12}O_4$; molecular weight=208.21: C, 63.45%; H, 5.8%. Found: C, 63.3%; H, 6%.

This compound is not described in the literature.

Step B: N-[β-(3,4-dimethoxyphenyl)-ethyl]-6'-hydroxymethyl-4',5'-dimethoxyphenyl-acetamide (IV, with $R_1=R_2=R_4=R_5=OCH_3$, $R_3=H_2$, $R_6=H$, $X'=H$).—0.4 gm. of 3-oxo-7,8-dimethoxy-isochromane (III, with $R_4=R_5=OCH_3$, $R_6=H$, $X'=H$) and 0.36 gm. of homoveratrylamine (IIIa, with $R_1=R_2=OCH_3$, $R_3=H_2$) were introduced into 15 cc. of ethanol. The mixture was heated to reflux for a period of 16 hours and thereafter distilled to dryness under vacuum.

The residue was dissolved in methylene chloride, washed with N/10 hydrochloric acid, then with water, dried and distilled to dryness under vacuum. N-[β-(3,4-dimethoxyphenyl)-ethyl]-6'hydroxymethyl - 4',5' - dimethoxyphenyl-acetamide (IV, with $$R_1=R_2=R_4=R_5=OCH_3$$

$R_3=H_2$, $R_6=H$, $X'=H$) was obtained which is utilized as such for the following step of the synthesis.

This compound is not described in the literature.

Step C: d,l-tetrahydropalmatine (I, with $$R_1=R_2=R_4=R_5=OCH_3$$

$R_3=H_2$, $R_6=H$).—0.72 gm. of N-[β-(3,4-dimethoxyphenyl) - ethyl] - 6' - hydroxymethyl - 4',5' - dimethoxyphenyl-acetamide (IV, with $R_1=R_2=R_4=R_5=OCH_3$, $R_3=H_2$, $R_6=H$, $X'=H$) were introduced into a mixture of benzene and phosphorus oxychloride (10:1) and heated to reflux for a period of 2 hours. Next the mixture was distilled to dryness under vacuum. The residue consisted of 1-[(3',4' - dimethoxy - 2' - chloromethylphenyl)-methyl]-6,7-dimethoxy - 3,4 - dihydro - isoquinoline (IVa, with $R_1=R_2=R_4=R_5=OCH_3$, $R_3=H_2$, $R_6=H$, $X'=H$, $X''=Cl$).

This residue was dissolved in aqueous ethanol, then while slightly cooling, over a period of 30 minutes, some potassium borohydride was added and the mixture was agitated for a period of two hours at a temperature of 30° C.

Thereafter, the mixture was diluted with water and extracted with methylene chloride. The extracts were washed with water, dried and distilled to dryness under a vacuum.

The residue was subjected to chromatography through alumina, and eluated with methylene chloride. The eluate was concentrated and poured into ether. Then the product which crystallized was vacuum filtered. The product was d,l - tetrahydropalmatine (I, $R_1=R_2=R_4=R_5=OCH_3$, $R_3=H_2$, $R_6=H$) having a melting point of 148° C.

EXAMPLE III

Preparation of 2,9,10-trimethoxy berbine (I, with $$R_1=R_4=R_5=OCH_3, R_2=R_6=H, R_3=H_2)$$

Step A: N-[β-(4-methoxyphenyl)-ethyl]-(2'-bromo-4',5'-dimethoxy-6'-hydroxymethyl)-phenyl - acetamide (IV, with $R_1=R_4=R_5=OCH_3$, $R_2=R_6=H$, $R_3=H_2$ and $X'=Br$).—2.5 gm. of paramethoxy-phenylethylamine (IIIa, with $R_1=OCH_3$, $R_2=H$, $R_3=H_2$) were dissolved at room temperature in 60 cc. of ethanol. Then a 4.2 gm. of 3-oxo-5-bromo-7,8-dimethoxy-isochromane (III, with $R_4=R_5=OCH_3$, $R_6=H$ and $X'=Br$) were introduced into the solution obtained and the mixture was heated to reflux for 19 hours.

The solution was next cooled and a precipitate was caused by pouring in water. The mixture was extracted with methylene chloride. The extracts were washed with 2 N hydrochloric acid, then with water and dried. The organic phase was filtered, concentrated to a small volume and the solvent was removed, after addition of sulfuric ether, by distillation.

The solution was concentrated to a small volume, iced for a period of ½ hour and then vacuum filtered. The precipitate was washed with sulfuric ether, and dried in an oven at 80° C. 5.69 gm. of N-[β-(4-methoxyphenyl)-ethyl] - (2' - bromo - 4',5'-dimethoxy-6'-hydroxymethyl)-phenyl-acetamide (IV, with $R_1=R_4=R_5=OCH_3$, $$R=R_6=H$$

$R_3=H_2$ and $X'=Br$) were obtained having a melting point of 145° C.

The product occurred in the form of colorless needles, slightly soluble in alcohol, and soluble in acetone and chloroform.

*Analysis.*—Calculated for $C_{20}H_{24}O_5NBr$; molecular weight=438.32: C, 54.81%; H, 5.51%; N, 3.19%; Br, 18.24%. Found: C, 54.9%; H, 5.8%; N, 3.5%; Br, 18.30%.

This compound is not described in the literature.

Step B: 1-[(2'-chloromethyl-3',4'-dimethoxy-6'-bromophenyl)-methyl] - 7-methoxy - 3,4-dihydro-isoquinoline (IVa, with $R_1=R_4=R_5=OCH_3$, $R_2=R_6=H$, $R_3=H_2$, $X'=Br$ and $X''=Cl$).—4.64 gm. of N-[β-(4-methoxy-phenyl)-ethyl] - (2'-bromo-4',5'-dimethoxy-6' - hydroxymethyl)-phenyl-acetamide (IV, with $R_1=R_4=R_5=OCH_3$, $R_2=R_6=H$, $R_3=H_2$ and $X'=Br$)

were dissolved at room temperature in 18 cc. of anhydrous phosphorus oxychloride and the reaction mixture was heated to reflux for a period of 2 hours. The solution was next cooled and then poured into a mixture of water and ice and the temperature was maintained between 0 and 10° C.

The gum formed was extracted with methylene chloride. The organic phase was washed with water, dried, filtered and distilled to dryness while finishing under vacuum. 1-[(2'-chloromethyl-3',4'-dimethoxy - 6'-bromo-phenyl)-methyl]-7-methoxy-3,4-dihydro-isoquinoline (IVa, with $R_1=R_4=R_5=OCH_3$, $R_2=R_6=H$, $R_3=H_2$, $X'=Br$, and $X''=Cl$) were obtained, which product was utilized as such for the next step of the synthesis.

This compound is not described in the literature.

Step C: 2,9,10-trimethoxy-12-bromo-berbine (V, with $R_1=R_4=R_5=OCH_3$, $R_2=R_6=H$, $R_3=H_2$ and $X'=Br$).—1-[(2'-chloromethyl - 3',4'-dimethoxy - 6'-bromophenyl)-methyl]-7-methoxy-3,4-dihydro-isoquinoline (IVa, with $R_1=R_4=R_5=OCH_3$, $R_2=R_6=H$, $R_3=H_2$, $X'=Br$ and $X''=Cl$), obtained according to the preceding step, was dissolved while agitating at room temperature in 50 cc. of ethanol containing 15% of water.

Next, 7 gm. of potassium borohydride were introduced into the solution over a period of 15 minutes. The solution was maintained under agitation for a period of 2 hours at room temperature and then poured into water. The mixture was extracted with methylene chloride. The methylene chloride extracts were washed with water, dried, filtered and distilled to dryness while finishing under vacuum. The gummy residue was obtained.

This residue was dissolved in acetone, perchloric acid was added until a pH of 1 was reached and crystallization was commenced by scratching. The mixture was iced for a period of a half hour, then vacuum filtered. The crystals were washed with acetone and 2.1 gm. of a crystallized product were obtained which was dissolved in methylene chloride. After alkaline washing, then aqueous washing, the organic solution was dried, filtered and distilled to dryness, while finishing under vacuum.

Recrystallization of the residue obtained furnished 1.45 gm. of 2,9,10-trimethoxy-12-bromo-berbine (V, with $R_1=R_4=R_5=OCH_3$, $R_2=R_6=H$, $R_3=H_2$, and $X'=Br$) having a melting point of 140° C.

This product occurred in the form of prisms and was slightly soluble in ethanol and soluble in acetone and chloroform.

Analysis.—Calculated for $C_{20}H_{22}O_3NBr$; molecular weight=404.3: C, 59.39%; H, 5.48%; N, 3.46%; Br, 19.76%. Found: C, 59.5%; H, 5.5%; N, 3.3%; Br, 19.7%.

This compound is not described in the literature.

Step D: 2,9,10-trimethoxy-berbine (I, with $R_1=R_4=R_5=OCH_3$, $R_2=R_6=H$, $R_3=H_2$)

1.54 gm. of 2,9,10-trimethoxy-12-bromo-berbine (V, with $R_1=R_4=R_5=OCH_3$, $R_2=R_6=H$, $R_3=H_2$, and $X'=Br$) were dissolved while heating at reflux in 75 cc. of ethanol. The reaction mixture was then cooled to room temperature and 7.5 cc. of sodium hydroxide solution were introduced while agitating. Next, over a space of 10 minutes, 6 gm. of powdered zinc were added to the reaction mixture and the mixture was heated to reflux for a period of 1 hour on an oil bath.

The reaction mixture was cooled, the powdered zinc was eliminated by filtration and washed with ethanol and methylene chloride. Then, the combined filtrates were poured into water and extracted with methylene chloride. The organic phase was washed with water, dried, filtered and distilled to dryness while finishing under vacuum.

The gummy residue obtained was dissolved in ether. The solution was passed through an adsorbent earth and thereafter concentrated to a small volume. Isopropyl ether was added, and the mixture was iced.

The precipitate was vacuum filtered, washed with isopropyl ether and dried. 1.04 gm., being a yield of 85%, of 2,9,10-trimethoxy-berbine (I, with $R_1=R_4=R_5=OCH_3$, $R_2=R_6=H$, $R_3=H_2$) were obtained having a melting point of 129° C.

The product occurred in the form of platelets and was very slightly soluble in ether, and soluble in alcohol, acetone and chloroform.

Analysis.—Calculated for $C_{20}H_{23}O_3N$; molecular weight =325.39: C, 73.82%; H, 7.12%; N, 4.3%. Found: C, 73.6%; H, 7.3%; N, 4.3%.

EXAMPLE IV

Preparation of 2,3,9,10-tetramethoxy-11-methyl-berbine (I, with $R_1=R_2=R_4=R_5=OCH_3$, $R_3=H_2$ and $R_6=CH_3$)

Preparation of (2-bromo-4,5-dimethoxy-phenyl)- acetic acid (II, with $R=H$, $R_4=R_5=OCH_3$, $R_6=H$, $X=Br$).—31 gm. of 3,4-dimethoxyphenyl-acetic acid were dissolved at a temperature of about 30° C. in 150 cc. of acetic acid. The mixture was cooled on an ice bath, then slowly under agitation 27.9 gm. of bromine were introduced and the mixture was allowed to stand in contact for a period of a half hour at room temperature.

The precipitate obtained was triturated next with water, agitated thoroughly for a period of an hour and a half, vacuum filtered and dried. 38.45 gm. of (2-bromo-4,5-dimethoxy-phenyl)-acetic acid (II, with $R=H$, $R_4=R_5=OCH_3$, $R_6=H$ and $X=Br$)

were obtained having a melting point of 110–120° C.

This product is colorless, and is slightly soluble in water and soluble in dilute aqueous alkalis, alcohol, ether, acetone, chloroform and a mixture of water and acetone.

Analysis.—Calculated for $C_{10}H_{11}O_4Br$; molecular weight=275.11: C, 43.65%; H, 4.03%; Br, 29.05%. Found: C, 43.9%; H, 4.2%; Br, 29.0%.

Step A: Methyl ester of (2-bromo-4,5-dimethoxy-phenyl)-acetic acid (II, with $R=CH_3$, $R_4=R_5=OCH_3$, $R_6=H$, and $X=Br$).—50 gm. of (2 - bromo - 4,5-dimethoxy - phenyl) - acetic acid (II, with $R=H$, $R_4=R_5=OCH_3$, $R_6=H$, and $X=Br$) were introduced into 100 cc. of methanol. 1 cc. of concentrated hydrochloric acid was added and the reaction mixture was heated to reflux for a period of 50 minutes. Next, the reaction mixture was poured onto ice, diluted with water, and brought to a pH of 10 by the addition of sodium bicarbonate.

The mixture was then extracted with methylene chloride. The organic phase was washed with water, dried and distilled to dryness and an oily residue was recovered. Petroleum ether was added to this oily residue and crystallization was brought about by scratching. The precipitate was vacuum filtered and 49.5 gm of the methyl ester of (2-bromo-4,5-dimethoxy-phenyl)-acetic acid (II, with $R=CH_3$, $R_4=R_5=OCH_3$, $R_6=H$, and $X=Br$) were obtained having a melting point of 66° C.

Starting from the mother liquors of crystallization, after distilling to dryness another 1.3 gm. of the identical product were recovered.

The product is colorless and is insoluble in dilute aqueous alkalis and soluble in the most part of the usual organic solvents.

This compound is not described in the literature.

Step B: Methyl ester of (2-bromo-3-chloromethyl-4,5-dimethoxy-phenyl)-acetic acid.—50.1 gm. of the methyl ester of (2-bromo-4,5-dimethoxy-phenyl)-acetic acid (II, with $R=CH_3$, $R_4=R_5=OCH_3$, $R_6=H$ and $X=Br$) were introduced into 800 cc. of methylene chloride and 100 cc. of the solvent were eliminated by distillation. The solution obtained was cooled and 50 gm. of pulverulent zinc chloride and 50 cc. of monochlorodimethyl ether were added thereto. The reaction mixture was agitated thoroughly at room temperature for a period of 66 hours.

Next the mixture was poured onto a mixture of water and ice. The resinous precipitate was dissolved by trituration in a mixture of water and methylene chloride and extracted with methylene chloride. The organic phase was washed with water, dried and subjected to chromatography through alumina with elution with methylene chloride in fractions of 600 cc., 450 cc. and 520 cc.

Fractions 2 and 3 were distilled to dryness and the residue crystallized from methanol while starting the crystallization by scratching. The crystals were vacuum filtered and after recrystallization from methanol, 18.06 gm. of the methyl ester of (2-bromo-3-chloromethyl-4,5-dimethoxy-phenyl)-acetic acid were obtained having a melting point of 65° C.

This product is colorless, it is slightly soluble in methanol, and soluble in alcohol, ether, acetone, benzene and chloroform.

This compound is not described in the literature.

Step C: Methyl ester of (2-bromo-3-methyl-4,5-dimethoxy-phenyl)-acetic acid (II, with $R=R_6=CH_3$, $R_4=R_5=OCH_3$, $X=Br$).—11 gm. of the methyl ester of (2 - bromo - 3 - chloromethyl-4,5-dimethoxy-phenyl)-acetic acid were dissolved while agitating in 200 cc. of acetic acid. The mixture was heated to 80° C. Then in a period of 40 minutes 35 gm. of pulverulent zinc were added and the heating of the reaction mixture was continued for a period of another hour.

The reaction mixture was cooled, the zinc was eliminated by filtration and washed with methylene chloride. The filtrates were combined and diluted with water. Thereafter the mixture was extracted with methylene chloride. The organic phase was recovered, washed successively with water, with sodium bicarbonate solution, then dried and distilled to dryness.

The residue was taken up in petroleum ether, triturated and then vacuum filtered and dried. 8.5 gm. of the methyl ester of (2 - bromo - 3 - methyl - 4,5 - dimethoxy-phenyl)-acetic acid (II, with $R=R_6=CH_3$, $$R_4=R_5=OCH_3$$

and $X=Br$) were obtained having a melting point of 70° C.

This product is insoluble in petroleum ether, it is soluble in alcohol, ether, benzene and chloroform.

Analysis.—Calculated for $C_{12}H_{15}O_4Br$; molecular weight=303.16: C, 47.54%; H, 4.99%; Br, 26.36%. Found: C, 47.4%; H, 5.1%; Br, 26.2%.

This compound is not described in the literature.

Step D: 3-oxo-5-bromo-6-methyl-7,8-dimethoxy-isochromane (III, with $R_4=R_5=OCH_3$, $R_6=CH_3$ and $X'=Br$).—8.50 gm. of the methyl ester of (2-bromo-3-methyl - 4,5 - dimethoxy - phenyl) - acetic acid (II, with $R=R_6=CH_3$, $R_4=R_5=OCH_3$, and $X=Br$) were dissolved in 200 cc. of methylene chloride. 40 cc. of the solvent were distilled therefrom in order to eliminate all traces of water. Then 9.5 gm. of fused, pulverized zinc chloride and 9 cc. of monochlorodimethyl ether were added and the reaction mixture was agitated for a period of 138 hours.

Next, the reaction mixture was poured into a mixture of water and methylene chloride. The organic phase was separated and washed alternately until neutrality of the wash waters with water and with sodium hydroxide solution. Then, 80 cc. of isopropanol and 50 cc. of N sodium hydroxide solution were added and the mixture was heated to reflux for a period of an hour and a half and finished by eliminating the most of the isopropanol by distillation. The mixture was cooled, 20 cc. of concentrated hydrochloric acid was added and it was allowed to stand for a period of 2 hours.

The residue formed was next taken up with methylene chloride. The solution was washed with sodium bicarbonate solution, with water, dried and distilled to dryness. The resulting product was crystallized from ether and 3.04 gm. of 3-oxo-5-bromo-6-methyl-7,8-dimethoxy-isochromane (III, with $R_4=R_5=OCH_3$, $R_6=CH_3$ and $X'=Br$) were obtained having a melting point of 135° C.

This compound is colorless, it is slightly soluble in ether, and soluble in acetone and chloroform.

Analysis.—Calculated for $C_{12}H_{13}O_4Br$; molecular weight=301.14: C, 47.86%; H, 4.35%; Br, 26.54%. Found: C, 47.7%; H, 4.5%; Br, 26.7%.

This compound is not described in the literature.

Step E: N - [β - (3,4 - dimethoxy - phenyl) - ethyl]-(2'-bromo - 3' - methyl - 4',5' - dimethoxy - 6' - hydroxymethyl) phenyl-acetamide (IV, with $R_1=R_2=R_4=R_5=OCH_3$, $R_3=H_2$, $R_6=CH_3$, and $X'=Br$).—10.42 gm. of 3-oxo-5-bromo-6-methyl-7,8-dimethoxy-isochromane (III, with $R_4=R_5=OCH_3$, $R_6=CH_3$, and $X'=Br$) and 6.57 gm. of β - (3,4 - dimethoxy - phenyl) - ethyl - amine (IIIa, with $R_1=R_2=OCH_3$, $R_3=H_2$) were dissolved in 100 cc. of ethanol and the solution was heated to reflux for a period of 20 hours. At the end of the reflux period, 60 cc. of solvent were distilled therefrom over a period of 1 hour and 40 minutes. Then the heating at reflux of the concentrated solution was continued for a further 3½ hours.

Thereafter the solution was iced. A spongy mass was obtained which was dissolved in ethanol on a water bath and the solution was diluted with water. Crystallization was brought about by scratching. Then the solution was iced and the precipitate was vacuum filtered and washed with water.

The product formed was recrystallized by heating in ethanol to 60° C., diluting with water and icing. The crystals were vacuum filtered, washed with water and dried. 15 gm., being a yield of 90%, of N-[β-(3,4-dimethoxy-phenyl) - ethyl] - (2' - bromo-3'-methyl-4',5'-dimethoxy-6'-hydroxymethyl)-phenyl-acetamide (IV, with $R_1=R_2=R_4=R_5=OCH_3$, $R_3=H_2$, $R_6=CH_3$, and $X'=Br$) were obtained having a melting point of 119° C.

This product is colorless and is insoluble in water and soluble in alcohol and chloroform.

Analysis.—Calculated for $C_{22}H_{28}BrNO_6$; molecular weight=482.37; C, 54.78%; H, 5.85%; Br, 16.57%; N, 2.9%. Found: C, 54.9%; H, 5.8%; Br, 16.8%; N, 2.6%.

This compound is not described in the literature.

Step F: 2,3,9,10-tetramethoxy-11-methyl-12-bromo-d, l - berbine (V, with $R_1=R_2=R_4=R_5=OCH_3$, $R_3=H_2$, $R_6=CH_3$ and $X'=Br$).—7 gm. of N-[β-(3,4-dimethoxy-phenyl)-ethyl] - (2'-bromo-3'-methyl-4',5'-dimethoxy-6'-hydroxymethyl)-phenyl-acetamide (IV, with $$R_1=R_2=R_4=R_5=OCH_3$$

$R_3=H_2$, $R_6=CH_3$, and $X'=Br$) were dissolved in 28 cc. of phosphorus oxychloride and heated to reflux for a period of 2 hours. The reaction was finished by distillation to dryness over the space of several minutes.

The residue formed was poured on a mixture of water and ice, then extracted with methylene chloride. The organic phase was washed with water and distilled to dryness. The residue consisted of 1-[(6'-bromo-3',4'-dimethoxy - 5'-methyl-2'-chloromethyl-phenyl)-methyl]-6,7-dimethoxy-3,4-dihydro-isoquinoline (IVa, with $$R_1=R_2=R_4=R_5=OCH_3$$

$R_3=H_2$, $R_6=CH_3$, $X'=Br$ and $X''=Cl$).

This residue was taken up in 120 cc. of ethanol and 20 cc. of water. 14 gm. of potassium borohydride were added over a space of a half hour at a temperature of about 15° C. Then the reaction mixture was agitated for a period of an hour and a half. The reaction mixture was next extracted with methylene chloride. The organic phase was washed with water and distilled to dryness. The residue was subjected to chromatography through alumina with elution with methylene chloride according to Table II below:

TABLE II

| Fraction: | Amount of Methylene Chloride, cc. | Product Obtained, mg. |
|---|---|---|
| 1 | 250 | |
| 2 | 260 | 425 |
| 3 | 170 | 800 |
| 4 | 270 | 1,337 |
| 5 | 400 | 1,028 |
| 6 | 480 | 610 |
| 7 | 500 | 370 |
| 8 | 750 | 334 |
| 9 | 660 | 180 |
| 10 | 500 | 80 |

The residues obtained from fractions 4 to 10 after evaporation to dryness were crystallized from ether.

After recrystallization from ether, 2,3,9,10-tetramethoxy - 11 - methyl - 12 - bromo - d,l - berbine (V, with $R_1=R_2=R_4=R_5=OCH_3$, $R_3=H_2$, $R_6=CH_3$, and $X'=Br$) was obtained.

Analysis.—Calculated for $C_{22}H_{26}BrNO_4$; molecular weight=448.36: C, 58.93%; H, 5.85%; N, 3.13%; Br, 17.82%. Found: C, 59.0%; H, 5.8%; N, 3.0%; Br, 17.7%.

This compound is not described in the literature.

Step G: 2,3,9,10-tetramethoxy-11-methyl-berbine (I, with $R_1=R_2=R_4=R_5=OCH_3$, $R_3=H_2$, $R_6=CH_3$).—4.6 gm. of 2,3,9,10-tetramethoxy-11-methyl-12-bromo-berbine (V, with $R_1=R_2=R_4=R_5=OCH_3$, $R_3=H_2$, $R_6=CH_3$ and $X'=Br$) were dissolved in 250 cc. of ethanol, 25 cc. of sodium hydroxide solution were added thereto and the reaction mixture was heated to reflux while introducing 40 gm. of pulverulent zinc over an interval of one hour. Thereafter the heating was continued for a period of one hour after the end of the introduction of zinc. The mixture was cooled and vacuum filtered. The filtrate was extracted with methylene chloride. The organic extracts were washed with water and distilled to dryness.

The residue was subjected to chromatography through alumina with elution with methylene chloride, then methylene chloride containing 1% of methanol and the fractions recovered were distilled to dryness. Thereafter the residue was crystallized from ether.

After recrystallization from ether, 3.09 gm. of 2,3,9,10-tetramethoxy-11-methyl-berbine (I, with $$R_1=R_2=R_4=R_5=OCH_3$$

$R_3=H_2$, $R_6=CH_3$) were obtained having a melting point of 141° C.

This product is slightly soluble in ether and is soluble in chloroform and methylene chloride.

Analysis.—Calculated for $C_{22}H_{27}NO_4$; molecular weight=369.45: C, 71.52%; H, 7.37%; N, 3.79%. Found: C, 71.7%; H, 7.5%; N, 3.8%.

This compound is not described in the literature.

EXAMPLE V

Preparation of 3,9,10-trimethoxy-berbine (I, with $R_2=R_4=R_5=OCH_3$, $R_1=R_6=H$, $R_3=H_2$)

Step A: N-[β-(3-methoxy-phenyl)-ethyl] - (2'-bromo-4',5'-dimethoxy - 6'-hydroxymethyl) - phenyl-acetamide (IV, with $R_2=R_4=R_5=OCH_3$, $R_1=R_6=H$, $R_3=H_2$ and $X'=Br$).—0.6 cc. of β-(m-methoxy-phenyl)-ethylamine (IIIa, with $R_2=OCH_3$, $R_1=H$, $R_3=H_2$) having a boiling point at 7 mm. of 122–123° C. (described by Helfer, Helv. Chim. Acta 7, 948 [1924]) were introduced into 5 cc. of ethanol. 1 gm. of 3-oxo-5-bromo-7,8-dimethoxy-isochromane (III, with $R_4=R_5=OCH_3$, $R_6=H$ and $X'=Br$), dissolved in 10 cc. of ethanol, were added thereto and the reaction mixture was heated to reflux for a period of 16 hours. Next the reaction mixture was cooled, poured into water, agitated, then extracted with methylene chloride. The organic phase was washed with 2 N hydrochloric acid and with water. Thereafter the organic phase was dried, filtered and concentrated to a small volume until the start of crystallization. Ether was added thereto and the methylene chloride was removed by distillation. The mixture was next iced for a period of one hour and the precipitate vacuum filtered, washed with ether and dried.

After recrystallization from hot isopropanol and hot ethyl acetate, 950 mg. of N-[β-(3-methoxy-phenyl)-ethyl]-(2'-bromo - 4',5'-dimethoxy - 6'-hydroxymethyl)-phenyl-acetamide (IV, with $R_2=R_4=R_5=OCH_3$, $R_1=R_6=H$, $R_3=H_2$ and $X'=Br$) were obtained having a melting point of 136° C.

The product occurred in the form of colorless crystals, slightly soluble in ether and soluble in acetone.

Analysis.—Calculated for $C_{20}H_{24}O_5NBr$; molecular weight=438.32: C, 54.8%; H, 5.51%; N, 3.19%; Br, 18.25%. Found: C, 54.7%; H, 5.5%; N, 3.2%; Br, 18.2%.

This compound is not described in the literature.

Step B: 3,9,10-trimethoxy-12-bromo-berbine (V, with $R_2=R_4=R_5=OCH_3$, $R_1=R_6=H$, $R_3=H_2$, and $X'=Br$).—(a) 4 cc. of phosphorus oxychloride were introduced into 40 cc. of anhydrous benzene. The mixture was heated, then cooled and 2 gm. of N-[β-(3-methoxyphenyl)-ethyl]-2'-bromo - 4',5'-dimethoxy - 6'-hydroxymethyl)-phenyl-acetamide (IV, with $R_2=R_4=R_5=OCH_3$, $R_1=R_6=H$, $R_3=H_2$ and $X'=Br$) were added thereto. The reaction mixture was next heated at reflux for a period of 2 hours, cooled, then poured on ice and agitated for a period of one hour. Thereafter the mixture was extracted with methylene chloride. The organic extracts were washed with water, dried, filtered and the filtrate evaporated to dryness while terminating under vacuum. The residue consisted of 1-[(6'-bromo-3',4'-dimethoxy-2'-chloromethyl-phenyl) - methyl]-6-methoxy - 3,4-dihydro-isoquinoline (IVa, with $R_2=R_4=R_5=OCH_3$, $R_1=R_6=H$, $R_3=H_2$, $X'=Br$ and $X''=Cl$).

(b) The residue obtained above was introduced into 40 cc. of ethanol containing 15% of water and cooled to about 10° C. Then, in small amounts, 3 gm. of potassium borohydride were added and the reaction mixture was agitated for a period of 3 hours. Thereafter the mixture was poured into water and extracted with methylene chloride. The organic phase was washed with water, dried, filtered and distilled to dryness while terminating under vacuum.

The residue was subjected to chromatography through magnesium silicate with elution with ether. The eluate was reduced to a small volume. Then crystallization was commenced and the solution was iced for a period of one hour. The precipitate was vacuum filtered, washed with ether and dried. 540 mg. of 3,9,10-trimethoxy-12-bromo-berbine (V, with $R_2=R_4=R_5=OCH_3$, $R_1=R_6=H$, $R_3=H_2$, and $X'=Br$), were obtained having a melting point of 142° C.

The product is soluble in ether and acetone.

Analysis.—Calculated for $C_{20}H_{22}O_3NBr$; molecular weight=404.31: C, 59.39%; H, 5.48%; N, 3.48%; Br, 19.76%. Found: C, 59.4%; H, 5.5%; N, 3.4%; Br, 19.7%.

This compound is not described in the literature.

Step C: 3,9,10-trimethoxy-berbine (I, with $$R_2=R_4=R_5=OCH_3, R_1=R_6=H, R_3=H_2$$

570 mg. of 3,9,10-trimethoxy-12-bromo-berbine (V, with $R_2=R_4=R_5=OCH_3$, $R_1=R_6=H$, $R_3=H_2$, and $X'=Br$) were dissolved in 28.5 cc. of ethanol while heating to reflux. After cooling the solution to room temperature, 3 cc. of sodium hydroxide solution and 4.6 gm. of pulverulent zinc were introduced. Then, the reaction mixture was heated to reflux for a period of an hour under agitation. The reaction mixture was next cooled to room temperature. The zinc was eliminated by filtration and washed with ethanol. The combined filtrates were diluted by the addition of 10 volumes of water and extracted with methylene chloride. The organic phase was washed with water, dried and distilled to dryness while terminating under vacuum.

The residue was subjected to chromatography through magnesium silicate with elution with ether. The eluate was reduced to a small volume and iced for a period of one hour. The precipitate was then vacuum filtered, washed with ether and dried. 360 mg. of 3,9,10-trimethoxy-berbine, (I, with $R_2=R_4=R_5=OCH_3$, $R_1=R_6=H$, and $R_3=H_2$) were obtained having a melting point of 128° C.

The product occurred in the form of small rods and was soluble in alcohol, ether, acetone and chloroform.

*Analysis.*—Calculated for $C_{20}H_{23}O_3N$; molecular weight=325.39; C, 73.82%; H, 7.13%; N, 4.30%. Found: C, 73.8%; H, 7.2%; N, 4.3%.

This compound is not described in the literature.

EXAMPLE VI

Preparation of 2,3,9,10-tetramethoxy-5,5-dimethyl-bergine (I, with $R_1=R_2=R_4=R_5=OCH_3$

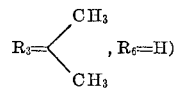

, $R_6=H$)

Preparation of the perchlorate of α,α-dimethyl-homoveratrylamine (IIIa, with $R_1=R_2=OCH_3$

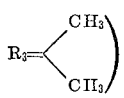

600 mg. of lithium aluminum hydride were introduced into 10 cc. of anhydrous dioxane. Then, drop by drop, a solution of 1 gm. of α,α-dimethyl-homoveratronitrile, described by Knabe et al., Arch. Pharm., 296, 591 (1963), in 5 cc. of dioxane was added and the reaction mixture was heated to reflux for a period of one hour. Next the reaction mixture was cooled to about 10° C. and thereafter, drop by drop, 20 cc. of dioxane containing 50% of water were introduced. The precipitate was filtered and washed with a mixture of hot dioxane and chloroform. The combined filtrates were extracted with methylene chloride. The organic phase was recovered, washed with water and reextracted with N hydrochloric acid solution.

The aqueous acidic phase was iced and neutralized by the addition of sodium hydroxide. Then the alkaline phase obtained was saturated with sodium chloride and extracted with methylene chloride. The organic phase was recovered, washed with water, dried, filtered and distilled to dryness under vacuum.

The residue was dissolved in methanol, cooled and an excess of concentrated perchloric acid was added thereto. The solution was iced. The precipitate was vacuum filtered, washed with methanol and with ether and dried. 0.8 gm. of the perchlorate of α,α-dimethyl-homoveratrylamine (IIIa, with $R_1=R_2=OCH_3$,

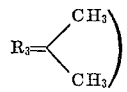

were obtained having a melting point of 270° C.

This product occurred in the form of colorless small rods, and was soluble in chloroform, slightly soluble in water and dilute aqueous acids and insoluble in ether, acetone and benezene.

*Analysis.*—Calculated for $C_{12}H_{20}O_6NCl$; molecular weight=309.74: C, 46.52%; H, 6.51%; N, 4.52%; Cl 11.45%. Found: C, 46.7%; H, 66%; N, 46%; Cl, 11.3%.

This compound is not described in the literature.

Step A: N-[β-(3,4-dimethoxy-phenyl) - β - dimethylethyl] - (2' - bromo - 4',5'-dimethoxy-6'-hydroxymethyl)-phenyl-acetamide (IV, with $R_1=R_2=R_4=R_5=OCH_3$,

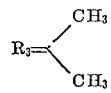

$R_6=H$ and $X'=Br$).—815 mg. of the perchlorate of α,α-dimethyl-homoveratrylamine (IIIa, with $R_1=R_2=OCH_3$,

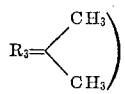

were introduced into 30 cc. of N sodium hydroxide solution. Then the mixture was extracted with methylene chloride. The organic phase was washed with water, filtered, dried and distilled to dryness under vacuum. 500 mg. of 3'- oxo - 5 - bromo - 7,8 - dimethoxy - isochromane (III, with $R_4=R_5=OCH_3$, $R_6=H$ and $X'=Br$) in 7.5 cc. of ethanol were added to the residue and the reaction mixture was heated to reflux for a period of 16 hours.

Thereafter the reaction mixture was distilled to dryness under vacuum. The residue was taken up with methylene chloride, then washed with aqueous phosphoric acid diluted to 1/100 and with water. The organic phase was filtered, dried and distilled to dryness under vacuum. 900 mg. of N-[β-(3,4-dimethoxy-phenyl)-β-dimethyl-ethyl]-(2'-bromo-4',5(-dimethoxy-6'-hydroxy - methyl) - phenyl-acetamide (IV, with $R_1=R_2=R_4=R_5=OCH_3$,

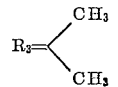

$R_6$ and $X'=Br$) were obtained.

The product is insoluble in water and dilute aqueous acids and alkalis. It is soluble in alcohol, ether, acetone, benzene and chloroform.

This compound is not described in the literature.

Step B: 1-[2'-chloromethyl-3',4'-dimethoxy-6'-bromophenyl)-methyl]-4,4 - dimethyl - 6,7 - dimethoxy - 3,4 - dihydro-isoquinoline (IVa, with $R_1=R_2=R_4=R_5=OCH_3$,

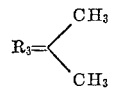

$R_6=H$, $X'=Br$ and $X''=Cl$).—3.8 gm. of N-[β-(3,4-dimethoxy - phenyl) - β - di - methyl - ethyl] - (2' - bromo-4',5' - dimethoxy - 6' - hydroxymethyl)-phenyl-acetamide (IV, with $R_1=R_2=R_4=R_5=OCH_3$

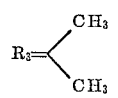

$R_6=H$, and $X'=Br$) were introduced into 75 cc. of anhydrous benzene. Then 7.6 cc. of anhydrous phosphorus oxychloride were added and the reaction mixture was heated to reflux for a period of one hour and a half. The mixture was concentrated under vacuum to a volume of about 10 cc., poured on a mixture of water and ice, then extracted with methylene chloride.

The organic phase was recovered, washed with water, dried, filtered and distilled to dryness. 3.8 gm. of 1-[(2'-chloromethyl-3',4'-dimethoxy-6'-bromophenyl) - methyl]-4,4-dimethyl-6,7 - dimethoxy - 3,4 - dihydro - isoquinoline

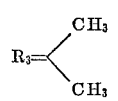

$R_6=H$, $X'=Br$ and $X''=Cl$) were obtained which was utilized as such for the following step of the synthesis.

This compound is not described in the literature.

21

Step C: 2,3,9,10-tetramethoxy-5,5-dimethyl-12-bromo-berbine (V, with $R_1=R_2=R_4=R_5=OCH_3$,

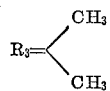

$R_6=H$ and $X'=Br$).—3.8 gm. of 1-[2'-chloromethyl-3',4'-dimethoxy-6'-bromophenyl)-methyl]-4,4 - dimethyl-6,7-dimethoxy-3,4-dihydro-isoquinoline (IVa, with $$R_1=R_2=R_4=R_5=OCH_3$$

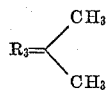

$R_6=H$, $X'=Br$ and $X''=Cl$) were introduced into 57 cc. of ethanol containing 15% of water. Then, at room temperature over a period of 15 minutes, 5.7 gm. of potassium borohydride were added and the reaction mixture was agitated for a period of 2 hours.

Next the reaction mixture was diluted with water, then extracted with methylene chloride. The organic phase was recovered and washed with water. Thereafter the organic phase was dried, filtered, and distilled to dryness. The residue was taken up in hot methanol. The solution was iced. The precipitate was vacuum filtered, washed with methanol and with ether and dried. 1.6 gm. of 2,3,9,10-tetramethoxy-5,5-dimethyl-12-bromo-berbine (V, with $R_1=R_2=R_4=R_5=OCH_3$,

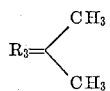

$R_6=H$ and $X'=Br$) were obtained having a melting point of 166° C. after recrystallization from methanol.

This product occurred in the form of yellow platelets and was insoluble in water, dilute aqueous alkalis and ether, slightly soluble in benzene, and soluble in dilute aqueous acids, alcohol, acetone and chloroform.

*Analysis.*—Calculated for $C_{23}H_{28}O_4NBr$; molecular weight=462.38: C, 59.74%; H, 6.10%; N, 3.01%; Br, 17.29%. Found: C, 60.0%; H, 6.2%; N, 3.0%; Br, 17.2%.

This compound is not described in the literature.

Step D: 2,3,9,10-tetramethoxy-5,5-dimethyl-berbine (I, with $R_1=R_2=R_4=R_5=OCH_3$,

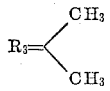

and $R_6=H$).—1 gm. of 2,3,9,10 - tetramethoxy - 5,5 - dimethyl-12-bromo-berbine (V, with $$R_1=R_2=R_4=R_5=OCH_3$$

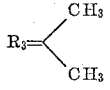

$R_6=H$ and $X'=Br$) was dissolved in 10 cc. of ethanol. 1 cc. of sodium hydroxide solution was added thereto and the reaction mixture was heated to the boiling point. Then slowly 1.6 gm. of pulverulent zinc were introduced and the reaction mixture was heated at reflux for a period of 1 hour. Next the mixture was cooled to room temperature. The zinc was eliminated by filtration and washed with ethanol, then with methylene chloride.

The filtrate was concentrated to a small volume, diluted with water, then extracted with methylene chrloride. The organic phase was recovered and washed with water, dried, filtered and distilled to dryness under vacuum.

22

The residue was then crystallized by heating and cooling in methanol and 760 mg. of 2,3,9,10-tetramethoxy-5,5-dimethyl-berbine (I, with $R_1=R_2=R_4=R_5=OCH_3$,

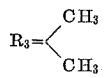

$R_6=H$) were obtained having a melting point of 60° C.

The product occurs in the form of clear yellow prisms and is insoluble in water and dilute aqueous alkalis and soluble in dilute aqueous acids, alcohol, ether, acetone, benzene and chloroform.

*Analysis.*—Calculated for $C_{23}H_{29}O_4N$; molecular weight=383.47: C, 72.03%; H, 7.62%; N, 3.65%. Found: C, 72.00%; H, 7.7%; N, 3.8%.

This compound is not described in the literature.

EXAMPLE VII

Preparation of 2,3,9,10-tetramethoxy-11-methoxymethyl-berbine (I, with $R_1=R_2=R_4=R_5=OCH_3$, $R_3=H_2$, $R_6=CH_2-OCH_3$)

Step A: Methyl ester of (2-bromo-3-chloromethyl-4,5-dimethoxy-phenyl)-acetic acid.—8.78 gm. of the methyl ester of (2-bromo-4,5-dimethoxy-phenyl)-acetic acid (II, with $R=CH_3$, $R_4=R_5=OCH_3$, $R_6=H$, $X=Br$) were dissolved while heating in 170 cc. of anhydrous methylane chloride. The mixture was cooled. 9 gm. of pulverulent zinc chloride and 9 cc. of monochlorodimethyl ether were then added thereto. The reaction mixture was agitated for a period of 3 days at room temperature. Thereafter, the mixture was diluted with water and extracted with methylene chloride. The organic phase was recovered, washed with water, then distilled to dryness. 10.1 of product were obtained.

The product obtained was subjected to chromatography through alumina and separated with elution with methylene chloride, distillation to dryness and crystallization of the residue from methanol. The methyl ester of (2-bromo-3-chloromethyl-4,5-dimethoxy-phenyl)-acetic acid was obtained having a melting point of 65° C.

*Analysis.*—Calculated for $C_{12}H_{14}O_4BrCl$; molecular weight=337.61: C, 42.69%; H, 4.18%; Br, 23.67%; Cl, 10.5%. Found: C, 43.1%; H, 4.4%; Br, 25%; Cl, 10.1%.

The ester described hereabove was accompanied in the reaction mixture with its isomer, the methyl ester of (2-bromo - 6 - chloromethyl - 4,5-dimethoxy-phenyl)-acetic acid which was not separated as the mixture can be utilized for the remainder of the synthesis.

These compounds are not described in the literature.

Step B: (2 - bromo - 3-methoxymethyl-4,5-dimethoxy-phenyl)-acetic acid (II, with $R=H$, $R_4=R_5=OCH_3$, $R_6=CH_2-OCH_3$ and $X=Br$).—10.1 gm. of a mixture containing the methyl esters of (2-bromo-3-chloromethyl-4,5 - dimethoxy - phenyl) - acetic acid and (2 - bromo-6-chloromethyl-4,5-dimethoxy-phenyl)-acetic acid were dissolved in 200 cc. of methanol. Then 200 cc. of aqueous N sodium hydroxide solution were added thereto and the reaction mixture was heated to reflux for a period of 40 minutes.

Next the mixture was cooled, brought to a pH of 1 by the addition of diluted hydrochloric acid and extracted with methylene chloride. The organic phase was washed with sodium bicarbonate solution and with water, dried and evaporated to dryness. The residue was then crystallized from methanol. 3 - oxo-5-bromo-7,8-dimethoxyisochromane was obtained having a melting point of 188° C.

The bicarbonated aqueous phase was acidified by the addition of hydrochloric acid and extracted with methylene chloride. The organic phase was distiled in order to eliminate the solvent and the residue was recrystallized from ether. (2 - bromo-3-methoxymethyl-4,5-dimethoxy-phenyl)-acetic acid (II, with $R=H$, $R_4=R_5=OCH_3$, $R_6=CH_2-OCH_3$ and $X=Br$) was obtained having a melting point of 65 to 68° C.

*Analysis.*—Calculated for $C_{12}H_{15}O_5Br$; molecular weight=319.16: C, 45.16%; H, 4.74%; Br, 25.04%. Found: C, 45.2%; H, 5.0%; Br, 24.8%.

This compound is not described in the literature.

Step C: Methyl ester of (2-bromo-3-methoxymethyl-4,5 - dimethoxy - phenyl) - acetic acid (II, with $R=CH_3$, $R_4=R_5=OCH_3$, $R_6=CH_2—OCH_3$ and $X=Br$).—5 gm. of (2 - bromo-3-methoxymethyl-4,5-dimethoxy-phenyl)-acetic acid (II, with $R=H$, $R_4=R_5=OCH_3$, $$R_6=CH_2—OCH_3$$

and $X=Br$) were dissolved in methylene chloride and cooled to about 0° C. Then a solution containing 1% of diazomethane in methylene chloride was introduced until a yellow color persisted in the reaction mixture.

The excess of the reactant was next destroyed by the addition of acetic acid. The solvent was removed and the methyl ester of (2-bromo-3-methoxymethyl-4,5-dimethoxy-phenyl)-acetic acid (II, with $R=CH_3$, $$R_4=R_5=OCH_3$$

$R_6=CH_2—OCH_3$ and $X=Br$) was obtained. The product was utilized for the following step of the synthesis.

This compound is not described in the literature.

Step D: 3 - oxo - 5 - bromo - 6 - methoxymethyl - 7,8-dimethoxyisochromane (III, with $R_4=R_5=OCH_3$, $$R_6=CH_2—OCH_3$$

and $X'=Br$).—5 gm. of the methyl ester of (2-bromo-3-methoxymethyl-4,5-dimethoxy-phenyl)-acetic acid (II, with $R=CH_3$, $R_4=R_5=OCH_3$, $R_6=CH_2—OCH_3$ and $X=Br$) were introduced into 100 cc. of anhydrous methylene chloride. Then 5 gm. of fused and pulverized zinc chloride and 5 cc. of monochloro-dimethyl ether were added thereto and the reaction mixture was allowed to agitate for a period of seven days at room temperature.

The mixture was then diluted with water and extracted with methylene chloride. The organic phase was washed with water until the wash waters were neutral and distilled to dryness. The residue obtained was dissolved in methanol. 100 cc. of aqueous N sodium hydroxide solution were added and the mixture was heated to reflux for a period of 1 hour. The mixture was cooled, acidified by addition of hydrochloric acid and taken up by methylene chloride. The organic phase was washed with sodium bicarbonate solution.

The organic phase was recovered, washed with water, dried and distilled to dryness under vacuum. 3-oxo-5-bromo-6-methoxymethyl-7,8-dimethoxy-isochromane (III, with $R_4=R_5=OCH_3$, $R_6=CH_2—OCH_3$ and $X'=Br$) was obtained.

This compound is not described in the literature.

Step E: N-[β-(3,4-dimethoxy-phenyl)-ethyl]-(2'-bromo-3' - methoxy - methyl 4',5' - dimethoxy - 6' - hydroxymethyl)-phenyl-acetamide (IV, with $$R_1=R_2=R_4=R_5=OCH_3$$

$R_3=H_2$, $R_6=CH_2—OCH_3$ and $X'=Br$).—1 gm. of 3-oxo-5-bromo-6-methoxymethyl - 7,8 - dimethoxy-isochromane (III, with $R_4=R_5=OCH_3$, $R_6=CH_2—OCH_3$ and $X'=Br$) and 0.7 gm. of β-(3,4-dimethoxyphenyl)-ethyl-amine (IIIa, with $R_1=R_2=OCH_3$, $R_3=H_2$) were introduced into 10 cc. of ethanol. The reaction mixture was heated to reflux for a period of 24 hours and thereafter distilled to dryness under vacuum.

The residue was taken up with methylene chloride. The excess of the amine was eliminated by extraction with an N hydrochloric acid solution. The organic phase was washed with water. Then the solvent was removed by distillation. N-[β-(3,4-dimethoxy-phenyl)-ethyl]-(2'-bromo-3'methoxymethyl - 4',5' - dimethoxy-6'-hydroxymethyl)-phenyl-acetamide (IV, with $R_1=R_2=R_4=R_5=OCH_3$, $R_3=H_2$, $R_6=CH_2—OCH_3$ and $X'=Br$) was obtained.

This compound is not described in the literature.

Step F: 2,3,9,10 - tetramethoxy-11-methoxymethyl-12-bromo-berbine (V, with $R_1=R_2=R_4=R_5=OCH_3$, $$R_6=CH_2—OCH_3$$

$R_3=H_2$ and $X'=Br$).—1 gm. of N-β(3,4-dimethoxyphenyl) - ethyl] - (2'-bromo - 3'methoxymethyl - 4',5' - dimethoxy-6'-hydroxymethyl)phenyl-acetamide (IV, with $R_1=R_2=R_4=R_5=OCH_3$, $R_3=H_2$, $R_6=CH_2—OCH_3$ and $X'=Br$) was introduced into 5 cc. of phosphorus oxychloride. The reaction mixture was heated to reflux for a period of 2 hours and the reaction was finished by distillation to dryness under vacuum without exceeding a temperature of 50° C. The residue consisted of 1-[(6'-bromo-3',4' - dimethoxy - 5' - methoxymethyl - 2' - chloromethylphenyl)-methyl] - 6,7-dimethoxy-3,4-dihydro-isoquinoline (IVa, with $R_1=R_2=R_4=R_5=OCH_3$, $R_3=H$, $$R_6=CH_2—OCH_3$$

$X'=Br$ and $X''=Cl$).

The residue obtained was taken up with 25 cc. of ethanol and 5 cc. of water. Then in the space of a half hour at a temperature of about 15° C., 4 gm. of potassium borohydride were added in small amounts and the reaction mixture was agitated for a further period of 2 hours at a temperature of 30° C.

The mixture was diluted with water and extracted with methylene chloride. The organic phase was washed with water and distilled to dryness. The residue was subjected to chromatography through alumina with elution with methylene chloride.

The gum obtained after evaporation of methylene chloride was crystallized from a mixture of ether and isopropyl ether (2:1). 2,3,9,10-tetramethoxy-11-methoxymethyl-12-bromo-berbine (V, with $$R_1=R_2=R_4=R_5=OCH_3$$

$R_3=H_2$, $R_6=CH_2—OCH_3$, $X'=Br$) was thus obtained.

This compound is not described in the literature.

Step G: 2,3,9,10 - tetramethoxy - 11 - methoxymethyl-berbine (I, with $R_1=R_2=R_4=R_5=OCH_3$, $$R_6=CH_2—OCH_3$$

and $R_3=H_2$).—200 mg. of 2,3,9,10 - tetramethoxy - 11 - methoxymethyl-12-bromo-berbine (V, with $$R_1=R_2=R_4=R_5=OCH_3$$

$R_3=H_2$, $R_6=CH_2—OCH_3$ and $X'=Br$) were dissolved in 10 cc. of ethanol. 1 cc. of 10 N sodium hydroxide solution was added thereto and the mixture was heated to reflux. Next over a space of a half hour 2 gm. of pulverulent zinc were introduced while maintaining the refluxing which was continued for a further period of one hour. The reaction mixture was next cooled, the zinc was filtered and washed with ethanol. The filtrates were diluted with water and extracted with methylene chloride. The organic phase was washed with water, concentrated to a small volume, then subjected to chromatography through alumina with elution with methylene chloride. The eluate was evaporated to dryness and the residue was crystallized from isopropyl ether. 2,3,9,10-tetramethoxy-11-methoxymethyl-berbine (I, with $R_1=R_2=R_4=R_5=OCH_3$, $$R_3=H_2$$

and $R_6=CH_2—OCH_3$) was obtained.

This compound is not described in the literature.

EXAMPLE VIII

Preparation of 2,3-methylenedioxy-9,10-dimethoxyberbine (or d,l-canadine) (I, with

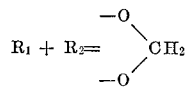

$R_4=R_5=OCH_3$  $R_3=H_2$ and $R_6=H$)

Step A: N-[β-(3,4-methylenedioxy-phenyl)-ethyl] 2'-bromo - 4',5' - dimethoxy - 6' - hydroxymethyl) - phenyl-acetamide (IV, with

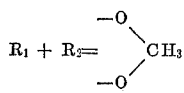

$R_4=R_5=OCH_3$, $R_3=H_2$, $R_6=H$ and $X'=Br$).—0.9 gm. of homopiperonylamine (IIIa, with

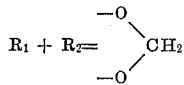

$R_3=H$) and 1.4 gm. of 3-oxo-5-bromo-7,8-dimethoxy-isochromane (III, with $R_4=R_5=OCH_3$, $R_6=H$ and $X'=Br$) were introduced into 25 cc. of ethanol. The reaction mixture was heated to reflux for a period of 18 hours and the reaction was finished by distilling to dryness under vacuum. The residue formed was taken up with methylene chloride, washed with N/10 hydrochloric acid solution, then with water. The organic phase was recovered and distilled to dryness. 2.1 gm. of N-[β-(3,4-methylenedioxy-phenyl) - ethyl] - (2' - bromo - 4',5' - dimethoxy - 6' - hydroxymethyl)-phenyl-acetamide (IV, with

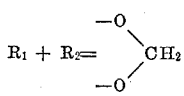

$R_4=R_5=OCH_3$, $R_3=H_2$, $R_6=H$ and $X'=Br$) were obtained which product was utilized as such for the next step of the synthesis.

This compound is not described in the literature.

Step B: 2,3-methylenedioxy-9,10-dimethoxy-12-bromoberbine (or 12-bromo-canadine) (V, with

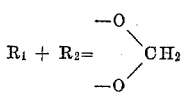

$R_4=R_5=OCH_3$ and $X'=Br$).— 1 gm. of N-[β-(3.4-methylenedioxy - phenyl) - ethyl] - (2' - bromo - 4',5'-dimethoxy-6'-hydroxymethyl) - phenyl - acetamide (IV, with

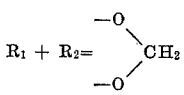

$R_4=R_5=OCH_3$, $R_3=H_2$, $R_6=H$ and $X'=Br$) was heated to reflux for a period of an hour and a half in 5 cc. of phosphorus oxychloride and the reaction was finished by distilling to dryness under vaccum. The residue consisted of 1 - [(6' - bromo - 3',4' - dimethoxy - 2' - chlormethyl-phenyl) - methyl] - 6.7 - methylenedioxy - 3,4 - dihydro-isoquinoline (IVa, with

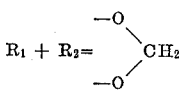

$R_4=R_5=OCH_3$, $R_3=H_2$, $R_6=H$, $X'=Br$ and $X''=Cl$).

The residue taken up in 25 cc. of ethanol and diluted with 5 cc. of water. Then over a period of 30 minutes at a temperature of about 10° C. 4 gm. of potassium borohydride were added in small amounts under agitation. The reaction mixture was agitated for a period of 2 hours thereafter at a temperature of 30° C., then poured into water.

The mitxure was extracted with methylene chloride. The organic phase was recovered, washed with water, dried and distilled to dryness, 0.75 gm. of 2,3-methylenedioxy-9,10-dimethoxy-12-bromo-berbine (V, with

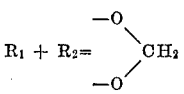

$R_4=R_5=OCH_3$, $R_6=H_2$, $R_3=H$ and $X'=Br$) were obtained which was utilized as such for the next step of the synthesis.

This compound is not described in the literature.

Step C: 2,3-methylenedioxy-9,10-dimethoxy-berbine (or d,1-canadine) (I, with

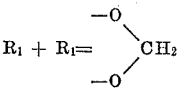

$R_4=R_5=OCH_3$, $R_3=H_2$ and $R_6=H$).—0.75 gm. of 2,3-methylenedioxy - 9,10 - dimethoxy - 12 - bromoberbine (V, with

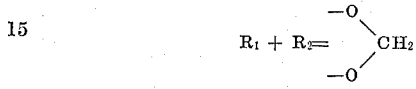

$R_4=R_5=OCH_3$, $R_3=H_2$, $R_6=H$ and $X'=Br$) and 3 cc. of 10 N sodium hydroxide solution were introduced into 30 cc. of ethanol. The mixture was heated to reflux. Then over a period of a half hour, 6.5 gm. of pulverulent zinc was added thereto. The heating to reflux of the reaction mixture was continued for a further period of one hour.

The mixture was then cooled. The zinc was eliminated by filtration and washed with ethanol. The filtrates were combined, taken up with water and extracted with methylene chloride.

The organic phase was recovered, washed with water, and distilled to dryness. The residue was subjected to chromatography through alumina and elution with methylene chloride. The eluate was evaporated to dryness. The residue was dissolved in ether and a current of gaseous hydrochloric acid was pased threthrough.

The precipitate formed was added to an aqueous N sodium hydroxide solution and the solution was extracted with methylene chloride. The oragnic phase was recovered, washed with water, dried and the solvent was eliminated by distillation. The residue was crystallized from ether 2,3-methylene-9,10-dimethoxy-berbine (I, with

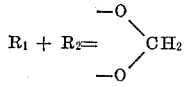

$R_4=R_5=OCH_3$, $R_3=H_2$ and $R_6=H$) was obtained having a melting point of 172° C. This product is also called d,1-canadine, a product described by Sallay et al. in Tetrahedron 19, 1397 (1963).

EXAMPLE IX

Preparation of 2-benzyloxy-3,9,10-trimethoxy-berbine (I, $R_2=R_4=R_5=OCH_3$, $R_1=OCH_2-C_6H_5$, $R_3=H_2$ and $R_6=H$).

Step A: 3-oxo-7,8-dimethoxy-isochromane, (III, with $R_4=R_5=OCH_3$, $X'=R_6=H$).—2 gm. of 3-oxo-5-bromo-7,8-dimethoxy-isochromane (III, with $R_4=R_5=OCH_3$, $R_6=H$ and $X'=Br$) were dissolved in 60 cc. of ethanol heated to reflux. 6 cc. of 10 N sodium hydroxide solution were added thereto. Then in a period of a half hour, 6 gm. of pulverulent zinc were added and the heating was continued for a period of 30 minutes.

Next the mixture was cooled. The zinc was eliminated by filtration and washed with ethanol. The filtrate was brought to a pH of 1 by the addition of hydrochloric acid, diluted with water and extracted with methylene chloride.

The organic phase was recovered, washed with water, dried, and distilled to dryness. 3-oxo-7,8-dimethoxy-isochromane (III, with $R_4=R_5=OCH_3$, $X'=R=H$) was obtained, having a melting point of 100° C.

This compound is not described in the literature.

Step B: N-[β-(4-benzyloxy-3-methoxy-phenyl)-ethyl]-(4', 5' - dimethoxy - 6' - hydroxymethyl) - phenyl - acetamide (IV, with $R_1=OCH_2-C_6H_5$, $R_2=R_4=R_5=OCH_3$, $R_3$=$H_2$ and X'=$R_6$=H).—0.2 gm. of 3-oxo-7,8-dimethoxy-isochromane (III, with $R_4$=$R_5$=$OCH_3$, X'=$R_6$=H) and 0.26 gm. of β-(3-methoxy-4-benzyloxy-phenylethyl-amine (IIIa, with $R_1$=$OCH_2$—$C_6H_5$, $R_2$=$OCH_3$, $R_3$=$H_2$) described by Kabayashi, Chem. Zentralblatt, I, 1027 (1928), were introduced into 5 cc. of ethanol, the mixture was heated to reflux for a period of 20 hours and the reaction was terminated by distillation to dryness under vacuum.

The residue was taken up in methylene chloride, washed with N/10 hydrochloric acid solution and with water. The organic phase was distilled to dryness. 0.44 gm. of N-[β-(4-benzyloxy-3-methoxy-phenyl)-ethyl]-(4', 5' - dimethoxy - 6' - hydroxymethyl) - phenyl - acetamide (IV, with $R_1$=$OCH_2$—$C_6H_5$, $R_2$=$R_4$=$R_5$=$OCH_3$, $R_3$=$H_2$, X'=$R_6$=H) were obtained.

This compound is not described in the literature.

Step C: 2-benzyloxy-3,9,10-trimethoxy-berbine (I, with $R_1$=$OCH_2$=$C_6H_5$, $R_2$=$R_4$=$R_5$=$OCH_3$, $R_3$=$H_2$ and $R_6$=H).—0.44 gm. of N-[β-(4-benzyloxy-3-methoxy-phenyl) - ethyl] - (4', 5' - dimethoxy - 6' - hydroxymethyl)-phenyl-acetamide (IV, with $R_1$=$OCH_2$—$C_6H_5$, $R_2$=$R_4$=$R_5$=$OCH_3$, $R_3$=$H_2$, X'=$R_6$=H) were introduced into 10 cc. of benzene containing 1 cc. of phosphorus oxychloride. The reaction mixture was headed to reflux for a period of 2 hours, then the reaction was terminated by distilling to dryness under vacuum. The residue consisted of 1-[3',4'-dimethoxy-2'-chloromethyl - phenyl) - methyl] - 6 - methoxy - 7 - benzyloxy - 3,4-dihydro-isoquinoline (IVa, with $R_1$=$OCH_2$—$C_6H_5$, $R_2$=$R_4$=$R_5$=$OCH_3$, $R_3$=$H_2$, X'=$R_6$=H and X''=Cl).

The residue was taken up with 15 cc. of ethanol and diluted with 2 cc. of water. Then, over a period of 30 minutes at a temperature of about 10° C., 1.5 gm. of potassium borohydride were added to the reaction mixture in small amounts and the reaction mixture was agitated for a period of 2 hours at a temperature of 30° C.

Next the mixture was diluted with water and extracted with methylene chloride. The organic phase was recovered, washed with water, dried and distilled to dryness. 2-benzyloxy-3,9,10-trimethoxy-berbine (I, with $R_1$=$OCH_2$—$C_6H_5$ $R_2$=$R_4$=$R_5$=$OCH_3$, $R_3$=$H_2$ and $R_6$=H) was obtained.

This compound is not described in the literature.

The preceding specific embodiments are illustrative of the invention. It is obvious however that other equivalent expedients known to those skilled in the art may be employed without departing from the spirit of the invention or the scope of the appended claims.

The derivatives of berbine of the general Formula I have a tranquilizing activity.

We claim:

1. A process for the preparation of a derivative of berbine of the formula

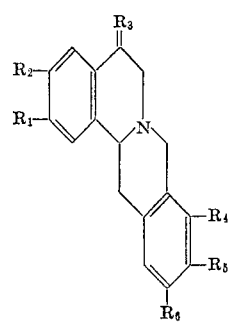

wherein $R_1$ and $R_2$ are members selected from the group consisting of hydrogen, methoxy, ethoxy, benzyloxy and, when taken together, methylenedioxy; $R_3$ is a member selected from the group consisting of $H_2$ and $(CH_3)_2$; $R_4$ and $R_5$ are the same substituents selected from the group consisting of methoxy and ethoxy; and $R_6$ is a member selected from the group consisting of hydrogen, methyl and methoxymethyl; which comprises the steps of (a) reacting a phenylacetic acid of the formula

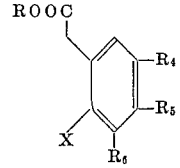

wherein $R_4$, $R_5$ and $R_6$ have the above-assigned meanings, R is a member selected from the group consisting of hydrogen and lower alkyl and X is a halogen having an atomic weight of over 35 with a formylating reagent selected from the group consisting of methoxychloromethane in the presence of a Lewis acid selected from the group consisting of tin chloride and zinc chloride and aqueous formaldehyde in the presence of sulfuric acid, (b) condensing the resulting isochromane of the formula

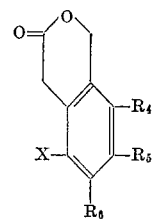

wherein X, $R_4$, $R_5$ and $R_6$ have the above-assigned meanings with a β-phenylethylamine of the formula

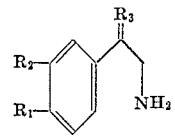

wherein $R_1$, $R_2$ and $R_3$ have the above-assigned values, (c) effecting a Bischler-Napieralski cyclization accompanied by halogenation on the resulting phenyl-acetamide of the formula

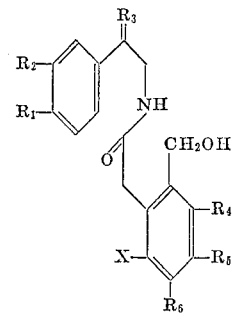

wherein $R_1$, $R_2$, $R_3$, $R_4$, $R_5$, $R_6$ and X have the above-assigned values, by the action of a halogenated derivative of pentavalent phosphorus, (d) reducing the resulting 3,4-dihydroisoquinoline of the formula

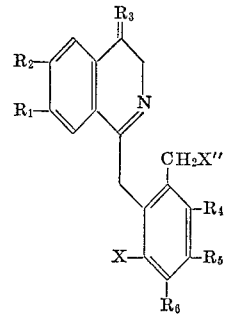

wherein $R_1$, $R_2$, $R_3$, $R_4$, $R_5$, $R_6$ and X have the above-assigned values and X'' represents a halogen, with simultaneous cyclization by the action of an alkali-metal borohydride, (e) dehalogenating the resulting 12-halo-berbine of the formula

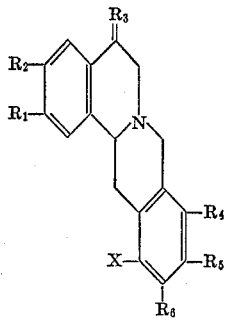

wherein $R_1$, $R_2$, $R_3$, $R_4$, $R_5$, $R_6$ and X have the above-assigned values, by reaction of a reducing agent selected from the group consisting of zinc in an alkaline solvent media and hydrogen in the presence of a catalyst, and (f) recovering said derivative of berbine.

2. The process of claim 1 wherein X in the starting phenylacetic acid is bromine.

3. The process of claim 1, step (c) wherein said Bischler-Napieralski cyclization accompanied by halogenation is effected by a halogenated derivative of a pentavalent phosphorus selected from the group consisting of phosphorus oxychloride, phosphorus pentachloride and phosphorus oxybromide at elevated temperatures up to the reflux temperature in a benzenic hydrocarbon solvent.

4. The process of claim 1, step (d) wherein said alkali-metal borohydride is selected from the group consisting of sodium borohydride and potassium borohydride and the reaction is conducted in the presence of an aqueous lower alkanol as solvent.

5. The process of claim 1, steps (b) to (e) wherein X is hydrogen and the isochromane of the formula

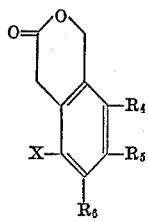

wherein $R_4$ and $R_5$ are the same substituents selected from the group consisting of methoxy and ethoxy, $R_6$ is a member selected from the group consisting of hydrogen, methyl and methoxymethyl and X is a halogen having an atomic weight of over 35, is subject to a dehalogenation with the aid of zinc in an alkaline medium.

6. A process for the preparation of 2,3,9,10-tetramethoxy-11-methyl-berbine which comprises the steps of (a) reacting a lower alkyl ester of 2-bromo-4,5-dimethoxy-phenyl-acetic acid with methoxychloromethane in the presence of a Lewis acid selected from the group consisting of tin chloride and zinc chloride, (b) dechlorinating the resulting lower alkyl ester of 2 - bromo - 3 - chloromethyl - 4,5 - dimethoxy - phenyl-acetic acid by the action of zinc and acetic acid.

(c) reacting the resulting lower alkyl ester of 2-bromo-3-methyl-4,5-dimethoxy-phenyl-acetic acid with methoxychloromethane in the presence of a Lewis acid selected from the group consisting of tin chloride and zinc chloride and alkalinizing the reaction mixture, (d) condensing the resulting 3-oxo-5-bromo-6-methyl-7,8-dimethoxy-isochromane with β-(3,4-dimethoxyphenyl)-ethyl amine in an organic solvent.

(e) reacting the resulting N-[β-(3,4-dimethoxy-phenyl)-ethyl]-(2'-bromo-3'-methyl - 4',5' - dimethoxy-6'-hydroxymethyl)-phenyl-acetamide with a halogen compound of pentavalent phosphorus, (f) reducing the resulting 1-[(6'-bromo-5'-methyl-3',4'-dimethoxy - 2' - halomethyl-phenyl)-methyl]-6,7-dimethoxy-3,4-dihydro-isoquinoline with an alkali-metal borohydride in an aqueous lower alkanol solvent, (g) debrominating the resulting 2,3,9,10-tetramethoxy-11-methyl-12-bromo-berbine by the action of zinc in an alkaline medium, and (h) recovering said 2,3,9,10-tetramethoxy-11-methyl-berbine.

7. A process for the preparation of 2,3,9,10-tetramethoxy-11-methoxymethyl-berbine which comprises the steps of (a) reacting a lower alkyl ester of 2-bromo-4,5-dimethoxy-phenyl-acetic acid with methoxychloromethane in the presence of a Lewis acid selected from the group consisting of tin chloride and zinc chloride, (b) reacting the resulting lower alkyl ester of 2-bromo-3-chloromethyl - 4,5 - dimethoxy-phenyl-acetic acid with methanol in the presence of an aqueous alkali-metal hydroxide solution and acidifying the solution with a mineral acid, (c) esterifying the resultant 2-bromo-3-methoxy-methyl-4,5-dimethoxy-phenyl-acetic acid by means of a diazo-lower alkane in the presence of an organic solvent, (d) reacting the resulting lower alkyl ester of 2-bromo-3 - methoxymethyl-4,5-dimethoxy-phenyl-acetic acid with methoxychloromethane in the presence of a Lewis acid selected from the group consisting of tin chloride and zinc chloride and alkalinizing the reaction mixture, (e) condensing the resulting 3-oxo-5-bromo-6-methoxymethyl-7,8-dimethoxy - isochromane with β-(3,4-dimethoxy-phenyl)-ethyl amine in an organic solvent, (f) reacting the resulting N-[β-(3,4-dimethoxyphenyl)-ethyl]-(2'-bromo-3'-methoxymethyl - 4',5' - dimethoxy-6'-hydroxymethyl)-phenyl-acetamide with a halogen compound of pentavalent phosphorus, (g) reducing the resulting 1-[(6'-bromo-5'-methoxymethyl - 3',4' - dimethoxy-2'-halomethyl - phenyl)-methyl]-6,7-dimethoxy-3,4-dihydro-isoquinoline with an alkali metal borohydride in an aqueous lower alkanol solvent, (h) debrominating the resulting 2,3,9,10-tetramethoxy-11-methoxymethyl-12-bromo-berbine by the action of zinc in an alkaline medium, and (i) recovering said 2,3,9,10-tetramethoxy-11-methoxymethyl-berbine.

8. A 12-halo-berbine derivative of the formula

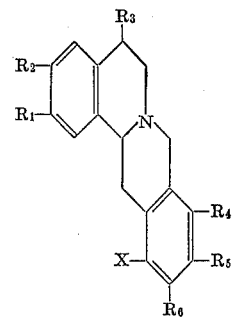

wherein $R_1$ and $R_2$ are members selected from the group consisting of hydogen, methoxy, ethoxy, benzyloxy and, when taken together, methylenedioxy; $R_3$ is a member selected from the group consisting of $H_2$ and $(CH_3)_2$; $R_4$ and $R_5$ represent the same substituents selected from the group consisting of methoxy and ethoxy; $R_6$ is a member selected from the group consisting of hydrogen, methyl and methoxymethyl; and X is a halogen having an atomic weight of over 35.

9. A berbine derivative selected from the group consisting of
(a) compounds of the formula

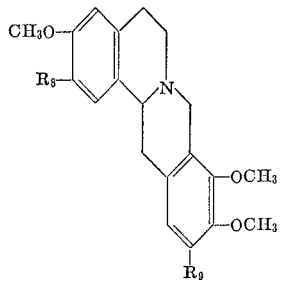

wherein $R_8$ is selected from the group consisting of methoxy and benzyloxy, and $R_9$ is selected from the group consisting of methyl and methoxymethyl, and
(b) compounds of the formula

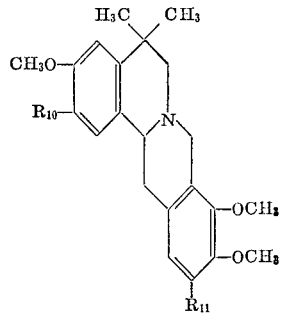

wherein $R_{10}$ is selected from the group consisting of hydrogen, methoxy and benzyloxy, and $R_{11}$ is selected from the group consisting of hydrogen, methyl and methoxymethyl.

10. 2,3,9,10-tetramethoxy-5,5-dimethyl-berbine.
11. 2,3,9,10-tetramethoxy-11-methyl-berbine.
12. 2,3,9,10-tetramethoxy-11-methoxymethyl-berbine.
13. 2-benzyloxy-3,9,10-trimethoxy-berbine.

References Cited

UNITED STATES PATENTS

| | | | |
|---|---|---|---|
| 2,634,292 | 4/1953 | Hellerbach | 260—289 X |
| 2,683,713 | 7/1954 | Shepard | 260—289 X |
| 3,103,513 | 9/1963 | Nauta | 260—283 |
| 3,272,707 | 9/1966 | Tedeschi | 260—289 X |

OTHER REFERENCES

Manske, J. Am. Chem. Soc., vol. 72, pp. 4796–7 (1950).
Bradsher et al., J. Org. Chem. vol. 26, pp. 2231–4 (1960).

ALEX MAZEL, *Primary Examiner.*

D. G. DAUS, *Assistant Examiner.*

U.S. Cl. X.R.

260—286, 575, 343.2, 570.9, 558, 521, 465, 236, 999